United States Patent
Shi et al.

(10) Patent No.: US 8,634,828 B2
(45) Date of Patent: Jan. 21, 2014

(54) METHOD AND APPARATUS FOR SWITCHING VIRTUAL SIM SERVICE CONTRACTS BASED UPON A USER PROFILE

(75) Inventors: Guangming Shi, San Diego, CA (US); Venkat Tangirala, San Diego, CA (US); Ta-yan Siu, San Diego, CA (US); Julian Durand, San Diego, CA (US); Stephen A Sprigg, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 656 days.

(21) Appl. No.: 12/480,406

(22) Filed: Jun. 8, 2009

(65) Prior Publication Data

US 2010/0311444 A1    Dec. 9, 2010

(51) Int. Cl.
*H04W 4/00*    (2009.01)
*H04B 1/38*    (2006.01)

(52) U.S. Cl.
USPC ......... 455/432.3; 709/217; 455/466; 455/558

(58) Field of Classification Search
USPC ................... 455/466, 558, 551, 436; 370/356
See application file for complete search history.

(56) References Cited

U.S. PATENT DOCUMENTS

| | | | |
|---|---|---|---|
| 5,428,666 A | 6/1995 | Fyfe et al. | |
| 5,763,862 A | 6/1998 | Jachimowicz et al. | |
| 5,987,325 A | 11/1999 | Tayloe | |
| 6,078,652 A | 6/2000 | Barak | |
| 6,212,372 B1 | 4/2001 | Julin | |
| 6,490,679 B1 | 12/2002 | Tumblin et al. | |
| 6,526,272 B1 | 2/2003 | Bansal et al. | |
| 6,643,504 B1 | 11/2003 | Chow et al. | |
| 6,829,593 B1 | 12/2004 | Ritter et al. | |
| 6,914,517 B2 | 7/2005 | Kinsella | |
| 7,039,221 B1 | 5/2006 | Tumey et al. | |
| 7,171,460 B2 | 1/2007 | Kalavade et al. | |
| 7,185,161 B2 | 2/2007 | Kang | |
| 7,218,930 B2 | 5/2007 | Ko et al. | |
| 7,593,605 B2 | 9/2009 | King et al. | |
| 7,676,222 B1 | 3/2010 | Helaine et al. | |
| 7,689,231 B2 | 3/2010 | Mardiks et al. | |
| 7,689,251 B2 | 3/2010 | Bae | |
| 7,738,891 B2 | 6/2010 | Tenhunen et al. | |

(Continued)

FOREIGN PATENT DOCUMENTS

| | | |
|---|---|---|
| CN | 1482568 A | 3/2004 |
| DE | 29821644 | 2/1999 |

(Continued)

OTHER PUBLICATIONS

International Search Report and Written Opinion—PCT/US2010/037807, International Search Authority—European Patent Office—Oct. 4, 2010.

*Primary Examiner* — Kashif Siddiqui
(74) *Attorney, Agent, or Firm* — James T. Hagler

(57) ABSTRACT

A system and method store provisioning data supporting a plurality of service providers in a VSIM internal memory unit of a mobile device. A user may specify a user profile to automatically enable provisioning data supporting one of the plurality of service providers stored in the VSIM internal memory unit to conduct a wireless communication when certain criteria values are satisfied. The automatic enabling of provisioning data may be determined based upon mobile device location, communication usage request and/or time and date.

23 Claims, 19 Drawing Sheets

(56) References Cited

U.S. PATENT DOCUMENTS

| | | |
|---|---|---|
| 7,787,602 B2 | 8/2010 | Pearson et al. |
| 2001/0044900 A1 | 11/2001 | Uchida |
| 2002/0072388 A1* | 6/2002 | Korneluk et al. ............ 455/551 |
| 2002/0095588 A1 | 7/2002 | Shigematsu et al. |
| 2002/0097855 A1 | 7/2002 | Neudeck et al. |
| 2002/0103964 A1 | 8/2002 | Igari |
| 2003/0046228 A1 | 3/2003 | Berney |
| 2003/0054800 A1 | 3/2003 | Miyashita |
| 2003/0083968 A1 | 5/2003 | Marsh et al. |
| 2003/0191939 A1 | 10/2003 | Tsai et al. |
| 2004/0022216 A1 | 2/2004 | Shi |
| 2004/0024670 A1 | 2/2004 | Valenzuela et al. |
| 2004/0039930 A1 | 2/2004 | Ohmori et al. |
| 2004/0050930 A1 | 3/2004 | Rowe |
| 2004/0087305 A1 | 5/2004 | Jiang et al. |
| 2004/0172541 A1 | 9/2004 | Ando et al. |
| 2004/0204051 A1 | 10/2004 | Scott et al. |
| 2004/0215968 A1 | 10/2004 | Rodwell et al. |
| 2004/0249915 A1 | 12/2004 | Russell |
| 2005/0020250 A1 | 1/2005 | Chaddha et al. |
| 2005/0039027 A1 | 2/2005 | Shapiro |
| 2005/0079863 A1 | 4/2005 | Macaluso |
| 2005/0101323 A1 | 5/2005 | De Beer |
| 2005/0124288 A1 | 6/2005 | Karmi et al. |
| 2005/0191998 A1 | 9/2005 | Onyon et al. |
| 2005/0193198 A1 | 9/2005 | Livowsky |
| 2005/0282554 A1 | 12/2005 | Shyy et al. |
| 2006/0068786 A1 | 3/2006 | Florence |
| 2006/0079237 A1 | 4/2006 | Liu et al. |
| 2006/0160532 A1 | 7/2006 | Buckley et al. |
| 2006/0172772 A1 | 8/2006 | Bjorkner |
| 2006/0181521 A1 | 8/2006 | Perreault et al. |
| 2006/0218337 A1 | 9/2006 | Hashimoto |
| 2006/0234693 A1 | 10/2006 | Isidore et al. |
| 2006/0282554 A1 | 12/2006 | Jiang et al. |
| 2006/0285538 A1* | 12/2006 | Oommen .................... 370/356 |
| 2006/0285663 A1 | 12/2006 | Rathus et al. |
| 2006/0291455 A1 | 12/2006 | Katz et al. |
| 2007/0060200 A1 | 3/2007 | Boris et al. |
| 2007/0094337 A1 | 4/2007 | Klassen et al. |
| 2007/0105531 A1 | 5/2007 | Schroeder |
| 2007/0130156 A1 | 6/2007 | Tenhunen et al. |
| 2007/0149170 A1 | 6/2007 | Bloebaum et al. |
| 2007/0178895 A1 | 8/2007 | Bot |
| 2007/0202895 A1 | 8/2007 | Benco et al. |
| 2007/0206838 A1 | 9/2007 | Fouquet |
| 2007/0218947 A1 | 9/2007 | Buckley |
| 2007/0223031 A1 | 9/2007 | Kitada et al. |
| 2007/0238449 A1 | 10/2007 | Park et al. |
| 2007/0254713 A1 | 11/2007 | Lagnado et al. |
| 2007/0255797 A1* | 11/2007 | Dunn et al. .................... 709/217 |
| 2008/0020755 A1* | 1/2008 | Liu et al. .................... 455/432.1 |
| 2008/0020773 A1 | 1/2008 | Black et al. |
| 2008/0028230 A1 | 1/2008 | Shatford |
| 2008/0051062 A1 | 2/2008 | Lee |
| 2008/0072299 A1 | 3/2008 | Reiher |
| 2008/0087720 A1 | 4/2008 | Levitov |
| 2008/0120504 A1 | 5/2008 | Kirkup et al. |
| 2008/0209545 A1 | 8/2008 | Asano |
| 2008/0223925 A1 | 9/2008 | Saito et al. |
| 2008/0254766 A1 | 10/2008 | Craven |
| 2008/0265024 A1 | 10/2008 | Tracy et al. |
| 2008/0289018 A1 | 11/2008 | Kawaguchi |
| 2008/0290161 A1 | 11/2008 | Blake |
| 2008/0311912 A1* | 12/2008 | Balasubramanian et al. 455/436 |
| 2009/0007250 A1 | 1/2009 | Pouzin et al. |
| 2009/0019528 A1 | 1/2009 | Wei et al. |
| 2009/0037207 A1 | 2/2009 | Farah |
| 2009/0061839 A1 | 3/2009 | Zimmerman et al. |
| 2009/0077643 A1 | 3/2009 | Schmidt et al. |
| 2009/0108988 A1 | 4/2009 | Cleveland et al. |
| 2009/0163175 A1 | 6/2009 | Shi et al. |
| 2009/0191846 A1 | 7/2009 | Shi |
| 2009/0215449 A1 | 8/2009 | Avner |
| 2009/0227230 A1 | 9/2009 | Camilleri et al. |
| 2010/0005313 A1 | 1/2010 | Dai |
| 2010/0112997 A1 | 5/2010 | Roundtree |
| 2010/0167724 A1 | 7/2010 | Haran et al. |
| 2010/0234009 A1 | 9/2010 | Antani et al. |
| 2010/0248690 A1 | 9/2010 | Biggs et al. |
| 2010/0279653 A1 | 11/2010 | Poltorak |
| 2010/0291924 A1 | 11/2010 | Antrim et al. |
| 2010/0311391 A1 | 12/2010 | Siu et al. |
| 2010/0311402 A1 | 12/2010 | Srinivasan et al. |
| 2010/0311404 A1 | 12/2010 | Shi et al. |
| 2010/0311418 A1 | 12/2010 | Shi et al. |
| 2010/0311468 A1 | 12/2010 | Shi et al. |
| 2011/0028135 A1 | 2/2011 | Srinivasan |
| 2011/0059738 A1 | 3/2011 | Waller |

FOREIGN PATENT DOCUMENTS

| | | |
|---|---|---|
| DE | 10146664 | 2/2003 |
| EP | 1012716 A1 | 6/2000 |
| EP | 1337119 A1 | 8/2003 |
| EP | 1638357 A1 | 3/2006 |
| EP | 1696357 | 8/2006 |
| EP | 1727383 | 11/2006 |
| EP | 2076071 | 7/2009 |
| GB | 2313257 | 11/1997 |
| GB | 2386803 | 9/2003 |
| JP | 4352548 A | 12/1992 |
| JP | H06284182 A | 10/1994 |
| JP | 3048638 B2 | 6/2000 |
| JP | 2000259820 A | 9/2000 |
| JP | 2002095038 A | 3/2002 |
| JP | 2002511968 A | 4/2002 |
| JP | 2002197186 A | 7/2002 |
| JP | 2002218536 A | 8/2002 |
| JP | 2002297257 A | 10/2002 |
| JP | 2002297552 A | 10/2002 |
| JP | 2003091509 A | 3/2003 |
| JP | 2003264631 | 9/2003 |
| JP | 2004134825 A | 4/2004 |
| JP | 2004178141 A | 6/2004 |
| JP | 2004206412 A | 7/2004 |
| JP | 2004220175 A | 8/2004 |
| JP | 2006054692 A | 2/2006 |
| JP | 2006114992 A | 4/2006 |
| JP | 2006121336 A | 5/2006 |
| JP | 2006211280 A | 8/2006 |
| JP | 2006295382 A | 10/2006 |
| JP | 2007200367 A | 8/2007 |
| JP | 2008518364 A | 5/2008 |
| JP | 2009514320 A | 4/2009 |
| JP | 2009542149 A | 11/2009 |
| KR | 20080021178 A | 3/2008 |
| KR | 20080100255 A | 11/2008 |
| RU | 2169437 C1 | 6/2001 |
| RU | 2300852 C2 | 6/2007 |
| WO | WO9219078 | 10/1992 |
| WO | WO9924938 | 5/1999 |
| WO | WO9946682 | 9/1999 |
| WO | WO0111577 | 2/2001 |
| WO | 0162029 A1 | 8/2001 |
| WO | WO02067563 | 8/2002 |
| WO | WO03007639 A1 | 1/2003 |
| WO | 03107112 A2 | 12/2003 |
| WO | 2004028191 A1 | 4/2004 |
| WO | WO2005029890 | 3/2005 |
| WO | 2006047764 A2 | 5/2006 |
| WO | WO2006094564 | 9/2006 |
| WO | 2007049856 A1 | 5/2007 |
| WO | 2007092099 A1 | 8/2007 |
| WO | WO2007143342 | 12/2007 |
| WO | WO2008040964 | 4/2008 |
| WO | 2008093671 A1 | 8/2008 |

* cited by examiner

151

| SID | Selection Preference | Roaming Indicator | Acquisition Index |
|---|---|---|---|
| Home System (SID) | First | Off | 0 |
| Roaming Partner 1 (SID) | Second | Off | 1 |
| Roaming Partner 2 (SID) | Third | Off | 2 |
| Roaming Partner 3 (SID) | Fourth | On | 3 |

152

| Acquisition Index | Acquisition Type | Blocks/Channel |
|---|---|---|
| 0 | PCS CDMA Blocks | B |
| 1 | PCS CDMA Blocks | A |
| 2 | PCS CDMA Channels | 283 699 384 777 |
| 3 | Cellular Analog | On |

Fig. 4

| Name | Time | Location | Application | Priority Index |
|---|---|---|---|---|
| Priority | 0 | 0 | 0 | 1 |
| Home | C1 | 0 | 0 | 2 |
| Work | 0 | C1 | 0 | 3 |
| Travel | 0 | C2 | 0 | 4 |
| Travel2 | 0 | C3 | 0 | 5 |
| E-mail | 0 | 0 | C1 | 6 |
| Internet | 0 | 0 | C2 | 7 |
| Travel3 | C3 | C1 | 0 | 8 |
| Travel4 | C3 | C2 | 0 | 9 |
| Email2 | C3 | 0 | C1 | 10 |
| MobileTV | C3 | 0 | C2 | 11 |
| Internet2 | C3 | C1 | C4 | 12 |
| MobileTV2 | C3 | C1 | C3 | 13 |

Fig. 13a

| Criteria | C1 | C2 | C3 | C4 |
|---|---|---|---|---|
| Time | 8:00 am - 5:00 pm | 5:00 pm - 11:00 pm | 11:00 pm - 8:00 am | any |
| Location | North America | Europe | Australia | Japan |
| Application | Voice | Text | E-Mail | Internet |

Fig. 13b

| Priority List Index | Svc. Acct #1 | Svc. Acct #2 | Svc. Acct #3 | Svc. Acct #4 | Svc. Acct #5 | Svc. Acct #6 | Svc. Acct #7 | Svc. Acct #8 |
|---|---|---|---|---|---|---|---|---|
| 1 | 1 | 2 | 0 | 3 | 0 | 0 | 0 | 0 |
| 2 | 0 | 0 | 1 | 0 | 2 | 3 | 4 | 0 |
| 3 | 2 | 1 | 0 | 3 | 0 | 0 | 0 | 0 |
| 4 | 3 | 2 | 0 | 1 | 0 | 0 | 0 | 0 |
| 5 | 0 | 0 | 2 | 0 | 1 | 3 | 0 | 0 |
| 6 | 0 | 0 | 1 | 0 | 3 | 1 | 0 | 2 |
| 7 | 0 | 0 | 0 | 0 | 0 | 3 | 1 | 0 |
| 8 | 0 | 0 | 1 | 0 | 0 | 0 | 0 | 0 |
| 9 | 1 | 0 | 0 | 0 | 0 | 0 | 0 | 0 |

Fig. 13c

| Name | Time | Location | Application | Priority Index |
|---|---|---|---|---|
| | Morning | North America | Voice | default |
| | Morning | Europe | Voice | default |
| | Morning | Asia | Voice | default |
| | Morning | North America | Text | default |
| | Morning | Europe | Text | default |
| | Morning | Asia | Text | default |
| | Morning | North America | Internet | default |
| | Morning | Europe | Internet | default |
| | Morning | Asia | Internet | default |
| Work voice | Business | North America | Voice | 1 |
| Travel work voice | Business | Europe | Voice | 3 |
| | Business | Asia | Voice | default |
| Work text | Business | North America | Text | 1 |
| Travel work text | Business | Europe | Text | 4 |
| | Business | Asia | Text | default |
| Work Internet | Business | North America | Internet | 1 |
| | Business | Europe | Internet | default |
| | Business | Asia | Internet | default |
| Personal | Evening | North America | Voice | 5 |
| Travel | Evening | Europe | Voice | 6 |
| | Evening | Asia | Voice | default |
| | Evening | North America | Text | default |
| | Evening | Europe | Text | default |
| | Evening | Asia | Text | default |
| | Evening | North America | Internet | default |
| | Evening | Europe | Internet | default |
| | Evening | Asia | Internet | default |

Fig. 16

METHOD AND APPARATUS FOR SWITCHING VIRTUAL SIM SERVICE CONTRACTS BASED UPON A USER PROFILE

RELATED APPLICATION DATA

This application is related to U.S. patent application Ser. No. 12/480,319, entitled "Virtual SIM for Mobile Handsets;" U.S. patent application Ser. No. 12/480,583, entitled "Method and Apparatus for Updating the Rules Governing the Switching of a Virtual SIM Service Contract;" and U.S. patent application Ser. No. 12/480,490, entitled "Method and Apparatus for Switching Virtual SIM Service Contracts when Roaming;" each of which is being filed concurrently with the instant application and each of whose contents is hereby incorporated by reference in its entirety.

FIELD OF INVENTION

The present invention relates generally to cellular telephone technologies, and more particularly to a system and method for selecting and enabling cellular telephone provisioning information based upon user specified preferences.

BACKGROUND OF INVENTION

Presently, mobile devices utilize a variety of technologies and formats which may include, for example, GSM (Global System for Mobile Communication), CDMA (Code Division Multiple Access) and/or UMTS (Universal Mobile Telecommunications System) technologies depending on the service provider of choice. In order to store the necessary provisioning data which allows the mobile device to communicate with a wireless communications network, GSM and UMTS mobile devices utilize a Subscriber Identity Module (SIM), commonly known as a SIM card. The SIM card is a detachable smart card containing the mobile device provisioning data, as well as a wealth of personal data, such as phonebooks, saved SMS messages, downloaded data, and personalization settings. Because the SIM card is detachable, multiple SIM cards with alternative provisioning information may be interchangeably inserted into the mobile device. In this manner, GSM and UMTS mobile devices may be used internationally simply by inserting a SIM card with the appropriate local provisioning information. By carrying multiple SIM cards each containing the provisioning information of a different service provider, a user may switch service providers simply by physically switching SIM cards. In addition, the interchangeable aspect of SIM cards allows a user to purchase limited term pre-paid SIM cards. Limited term pre-paid SIM cards provide a user with access to a communication network so long as the pre-paid SIM card account remains valid. This option allows a user to essentially maintain service contracts with a wide variety of service providers as opposed to the conventional manner of maintaining a service contract with a single service provider. This allows a user to access a multitude of communication networks.

The limited term pre-paid SIM card option is particularly useful, for example, to international travelers who desire access to local wireless communication networks for the duration of their travels, but do not require additional access to local wireless communication networks after their return home. However, since the user's personal SIM card is replaced with the pre-paid SIM card during travel, the user cannot access personal data stored on their personal SIM card. This may cause frustration to the user as personal data such as contact data stored in the phone book on the personal SIM is no longer accessible while the pre-paid SIM card is in use. In addition, if the user travels out of the region for which the pre-paid SIM card provides wireless communication network access, the user must purchase a different pre-paid SIM card with the appropriate provisioning data for the new region. As a result, a user may have to carry a number of different pre-paid SIM cards and keep track of which pre-paid SIM card contains the appropriate provisioning data for each region.

While analogous devices for other mobile network systems have been developed, such as the Removable User Identity Module (RUIM), Universal Subscriber Identity Module (USIM) or Universal Integrated Circuit Card (UICC) (referred to herein as "smart cards"), these devices suffer from the same problems of personal data loss when the RUIM, USIM or UICC is removed in favor of a pre-paid locally provisioned smart card.

While some CDMA mobile devices store provisioning information on a removable card that can be moved from mobile device to mobile device, many CDMA phones do not provide this capability. Thus, many CDMA device users are not afforded the option of utilizing their personal mobile device when traveling abroad. Typically, these users must rent a mobile device or purchase a disposable device which has been provisioned for local use or that may accept a SIM card.

Still other non-international traveling users may find the ability to quickly access the wireless communication networks of multiple service providers appealing. A typical mobile device user subscribes to a single service provider for wireless communication service for a relatively long term contract. A user may select a service provider based on a number of considerations including, but not limited to cost, network coverage and services available. While service providers may excel in certain aspects they may fail in other aspects. A user may need to make tradeoffs when selecting a single service provider. By utilizing SIM cards, a user is no longer constrained to a single service provider. A user may select a service provider to use based upon which service provider will provide the optimal service for the user's specific need. Then the user may simply replace the current SIM card with the SIM card of the desired service provider on a per usage basis. For example, suppose service provider A provides excellent network coverage for voice communication on the east coast but not on the west coast, and provides slow data services. While on the east coast and conducting voice calls a user may elect to insert the SIM card for service provider A. However, if the user travels to the west coast or wishes to conduct a data call, the user may elect to replace service provider A's SIM card with another service provider's SIM card. In this manner, a user may optimize wireless communication services, but must keep track of and carry multiple physical SIM cards.

Consequently, a system and method is desired to allow users to more easily modify the provisioning data according to location, usage, and/or time.

SUMMARY

In various embodiments a system and method is provided for modifying the provisioning data contained within the memory of mobile devices. Provisioning data is stored within a virtual SIM (VSIM) card which may be contained as part of the mobile device's internal memory. The provisioning data for multiple service providers may be stored within a VSIM and may be selectively enabled and disabled according to user defined profiles depending upon various criteria category values such as time, location, and/or usage request.

BRIEF DESCRIPTION OF THE DRAWINGS

The accompanying drawings, which are incorporated herein and constitute part of this specification, illustrate embodiments of the invention, and, together with the general description given above and the detailed description given below, serve to explain features of the invention.

FIG. 4 is a system and acquisition table of an exemplary preferred roaming list (PRL).

FIG. 13a is an exemplary user profile data table for use in an embodiment to select and switch a VSIM service contract in accordance with a user specified preference.

FIG. 13b is an exemplary criteria category value table for use in an embodiment to select and switch a VSIM service contract in accordance with a user specified preference.

FIG. 13c is an exemplary priority list index data table for use in an embodiment to select and switch a VSIM service contract in accordance with a user specified preference.

FIG. 16 is an exemplary user profile data table for use in an alternative embodiment to select and switch a VSIM service contract in accordance with a user specified preference.

DETAILED DESCRIPTION

Figure 1:
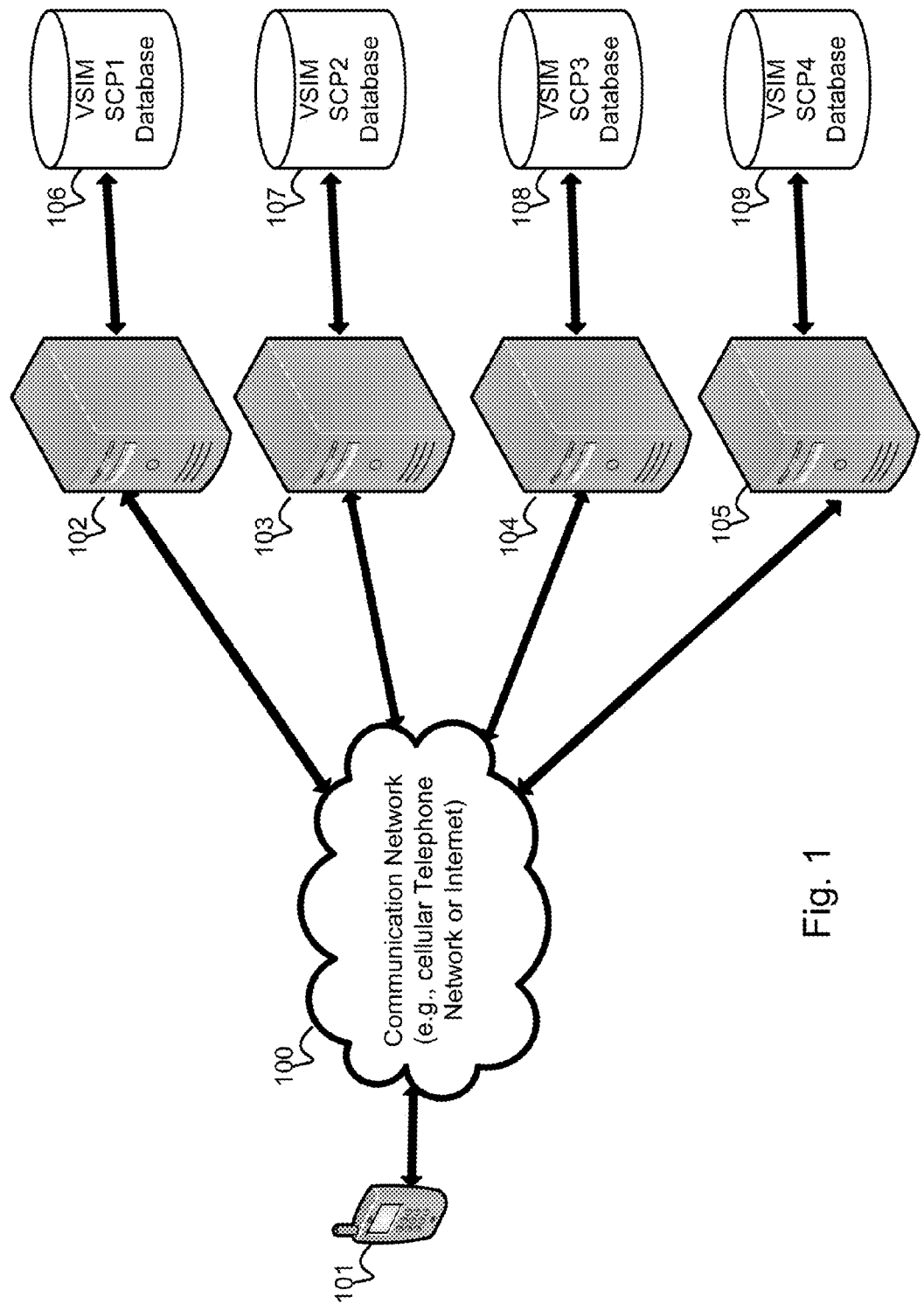
FIG. 1 is a system diagram illustrating an embodiment system which provides for virtual SIM (VSIM) service contracts.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term mobile device may refer to any one or all of cellular telephones, personal data assistants (PDA's), palm-top computers, laptop computers, wireless electronic mail receivers (e.g., the Blackberry® and Treo® devices), multimedia Internet enabled cellular telephones (e.g., the iPhone®), and similar personal electronic devices which include a programmable processor and memory. In a preferred embodiment, the mobile device is a cellular handset that can communicate via a cellular telephone network (e.g., a cellphone).

As used herein, the term "server" refers to any of a variety of commercially available computer systems configured to operate in a client-server architecture. In particular, the term "server" refers to network servers, particularly Internet accessible servers, which typically include a processor, memory (e.g., hard disk memory), and network interface circuitry configured to connect the server processor to the network, such as the Internet or a cellular telephone network.

Recently, some users of mobile device have begun to subscribe to multiple service providers for service so that they may use different service providers for different purposes. These users store the provisioning data for the different service contracts on SIM cards and simply interchange the SIM card containing the desired provisioning data. Additionally, alternative service provider contracts have become available to users of mobile devices. Rather than requiring users to commit to long term service contracts where users maintain a monthly account with a single service provider, short term pre-paid service contracts are available to users from a variety of service providers which allow users to access the service provider's communications network for a limited duration. Typically, a user using a short term pre-paid service contract (PPSC) will be able to access the communication network for a limited number of minutes, a limited number of bytes of data transferred, or a combination thereof. Once the user has accessed the communication network for the limited number of minutes, transferred the limited number of bytes of data, or both, the short term pre-paid service contract will expire. For sake of simplicity, PPSCs will be discussed herein as being limited in number of minutes only. However, one of skill in the art would appreciate that the embodiments described herein may similarly operate with PPSCs limited in duration (e.g., some number of minutes, days, weeks or months), number of bytes of data transferred or a combination of time, minutes and bytes of data transferred. Traditionally, short term pre-paid service contracts are established through the purchase of Subscriber Identity Module (SIM) cards. Interchangeable SIM cards containing the necessary provisioning data which allow access to a service provider's communication network may be purchased and inserted into a user's mobile device. Once activated, the service provider supporting the short term pre-paid service contract may monitor usage and deny access to the communication network once the service contract expires.

The SIM card is a removable memory chip or smart card used in GSM and UMTS mobile devices to store the necessary provisioning data, such as the service-subscriber key used to identify a mobile device to wireless communication networks, to enable the mobile device to access a particular communication network. User can use different mobile devices by simply removing the SIM card from one mobile device and inserting it into another. A typical low cost SIM card has a small memory, 2-3 KB, which may only be enough to contain provisioning data and perhaps a personal phone directory. Data stored in a SIM card is used by the phone directly. SIM cards with additional applications are available in many storage sizes, the largest being capable of storing up to 1 gigabyte of information. Smaller sized SIM cards, capable of storing up to 32 KB or 16 KB, are the most prevalent in areas with less-developed GSM networks.

The use of a SIM card is mandatory in GSM cellular telephone networks. SIM cards store network specific information used to authenticate and identify subscribers on the network, the most important of which are the ICCID, IMSI, Authentication Key (Ki), and Local Area Identity (LAI). The SIM also stores other carrier specific data such as the SMSC (Short Message Service Centre) number, Service Provider Name (SPN), Service Dialing Numbers (SDN), and Value Added Service (VAS) applications. The equivalent of a SIM card in UMTS cellular telephone networks is called the Universal Integrated Circuit Card (UICC). CDMA phones may contain an analogous Removable User Identity Module (RUIM).

While the portability of SIM cards makes them ideal platforms to distribute PPSCs, their use is not without disadvantage. For example, each of the short term pre-paid service contract SIM cards (pre-paid SIM) are provisioned with a pre-provisioned phone number. Each time a particular pre-paid SIM is inserted into a mobile device, the phone number of the mobile device will change. Consequently, each time the user replaces the pre-paid SIM, callers unaware of the pre-paid SIM replacement will be unable to contact the user's mobile device. In addition, because the pre-paid SIM replaces a user's personal SIM card, the user's personal data stored on the personal SIM card is unavailable to the user while the pre-paid SIM is in use. Also, each pre-paid SIM is typically serviced by a single service provider. If a user desires to utilize the communication network of another service provider, the user must remove the pre-paid SIM card and replace it with another. Thus, if the user travels outside of the region for which a particular SIM card is provisioned for, the user must replace the SIM card with another. This is the case of international travel.

Similarly, if the user wishes to access another service provider's communication network to take advantage of certain superior features, the user must also replace the SIM card with another. For example, some service providers may provide better voice communications while other service providers may provide better data communications. This constant replacement of physical SIM cards can be cumbersome. Not only must the user physically change out the SIM card, the user must also carry a variety of different SIM cards.

The various embodiments alleviate these problems by creating a virtual SIM (VSIM) card capability enabling portions of the mobile device's internal memory to store the provisioning information for a variety of service providers. The VSIM may be implemented on all mobile devices, including GSM, UMTS and CDMA varieties. A user may purchase a VSIM service contract (PPSC or otherwise) from any service provider and download the corresponding provisioning data for that service provider. The provisioning information may be loaded into the VSIM of the mobile device. Moreover, a user may store the provisioning information for multiple service contracts on the VSIM. Thereafter, users may switch service providers merely by setting a user profile to control the switching of service contracts depending on various criteria category values specified by the user. In instances where the user travels from one region to another (i.e., international travel), the user may quickly access and implement the appropriate provisioning information for the region in which the user is currently located. Additionally, it is possible for the user to maintain a constant phone number despite the changes to the implemented provisioning information. In this manner, callers may continue to contact the user's mobile device regardless of which service contract is currently enabled on the VSIM.

FIG. 1 illustrates an overall system of an embodiment wherein each service provider offering a VSIM service contract operates their own VSIM service contract provisioning (SCP) server 102-105. A user may purchase and obtain a VSIM PPSC or a VSIM monthly service contract (MSC) (collectively VSIM service contracts) by connecting to the service provider's VSIM SCP server 102-105 through a communication network 100 to download the appropriate provisioning data to support the desired service contract. The communication network 100 may be, for example, either a cellular telephone network or the Internet. For sake of simplicity, the various embodiments will be described as a mobile device 101 connected to a VSIM SCP server via a cellular telephone network. However, one of skill in the art would appreciate that a user may also connect to a VSIM SCP server via the Internet and subsequently transfer the provisioning data of the SCP to the mobile device VSIM. While FIG. 1 depicts four separate VSIM SCP servers 102-105, the number of VSIM SCP servers will depend on the number of service providers offering VSIM service contracts. The VSIM SCP servers 102-105 may contain internal memory storage units such as a mass storage disc drive, or may be in connection with a corresponding VSIM SCP database 106-109, which are capable of storing the provisioning data and account status for each individual VSIM service contract (PPSC or MSC) operating on the system. Each of VSIM SCP servers 102-105 and VSIM SCP databases 106-109 may be operated by different service providers. Additionally, each VSIM SCP server 102-105 and/or VSIM database 106-109 may offer a variety of service contracts to the user. For example, each VSIM SCP server 102-105 and/or VSIM database 106-109 may offer users either VSIM PPSCs or VSIM MSCs. Additionally, varying VSIM service contracts may provide which voice only services, data only services or a combination thereof.

The various embodiments may be implemented on any of a variety of mobile devices, such as, for example, cellular telephones, personal data assistants (PDA) with cellular telephone, mobile electronic mail receivers, mobile web access devices, and other processor equipped devices that may be developed in the future. In addition, the embodiments described above may be implemented on any of a variety of computing devices, including but not limited to desktop and laptop computers.

Figure 2:
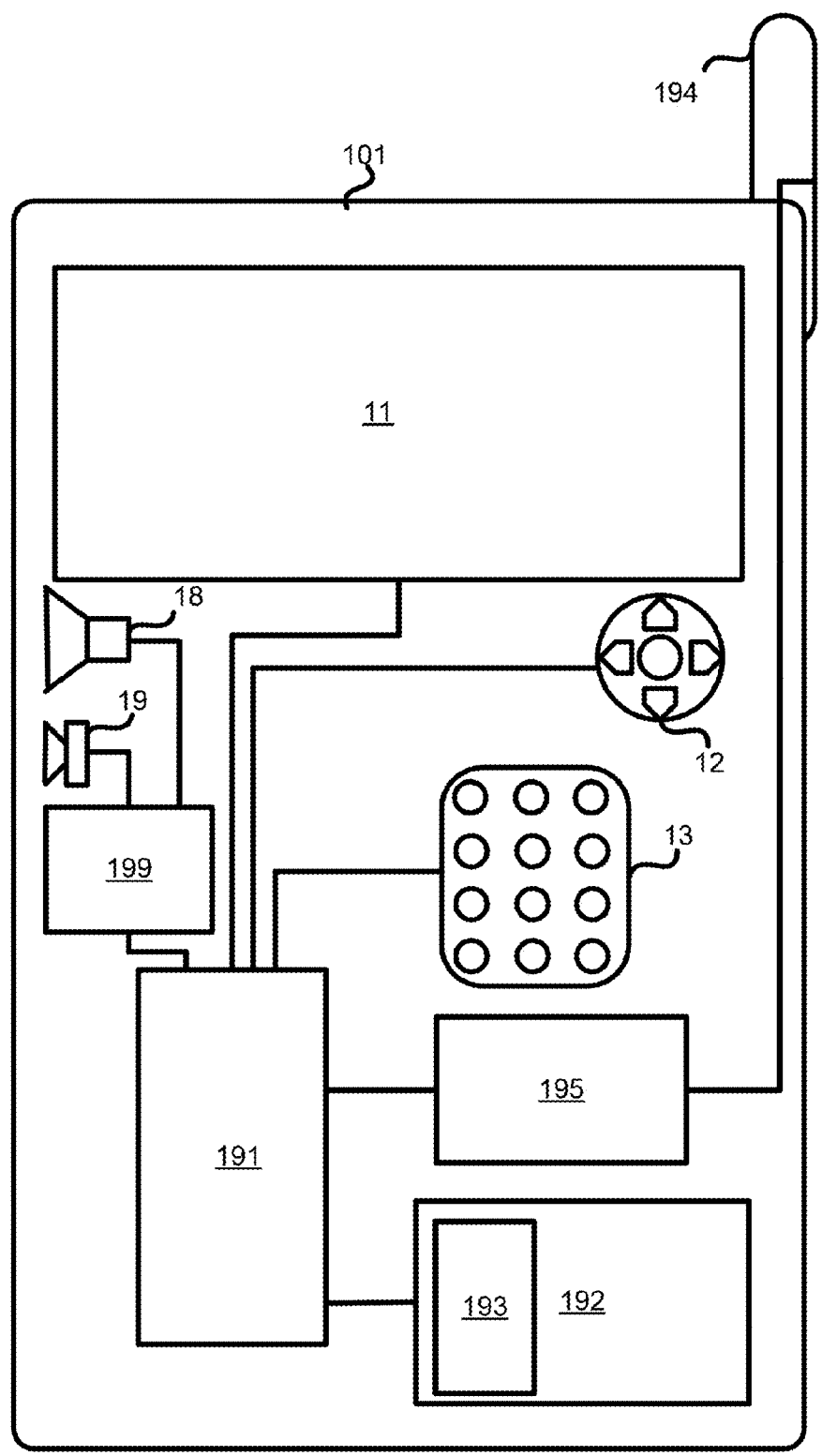
FIG. 2 is a system block diagram of a mobile device suitable for use in an embodiment.

FIG. 2 depicts typical components of a mobile device 101 capable of supporting the various embodiments. A typical mobile device 101 includes a processor 191 coupled to internal memory 192 and a user interface display 11. The internal memory 192 includes a VSIM memory unit 193 which is used to store the provisioning information of a plurality of VSIM PPSC accounts. The VSIM memory unit 193 may be a partition within the mobile device internal memory 192 or may be a separate internal memory unit (i.e., a separate memory chip). In addition, the VSIM memory unit 193 may store personal data downloaded from a VSIM server 130 for use with applications being executed on the mobile device processor 191.

The mobile device 101 may include an antenna 194 for sending and receiving electromagnetic radiation that is connected to a wireless data link and/or cellular telephone transceiver 195 coupled to the processor 191. In some implementations, the transceiver 195 and portions of the processor 191 and memory 192 used for cellular telephone communications are referred to as the air interface since the combination provides a data interface via a wireless data link. Further, the mobile device 101 includes a speaker 18 to produce audible sound and a microphone 19 for sensing sound, such as receiving the speech of a user. Both the microphone 19 and speaker 18 may be connected to the processor 191 via a vocoder 199 which transforms analog electrical signals received from the microphone 19 into digital codes, and transform digital codes received from the processor 191 into analog electrical signals which the speaker 18 can transform into sound waves. In some implementations, the vocoder 199 may be included as part of the circuitry and programming of the processor 191.

The processor 191 may be any programmable microprocessor, microcomputer or multiple processor chip or chips that can be configured by software instructions (applications) to perform a variety of functions, including the functions of the various embodiments described below. In some mobile devices, multiple processors 191 may be provided, such as one processor dedicated to wireless communication functions and one processor dedicated to running other applications. Typically, software applications may be stored in the internal memory 192 before they are accessed and loaded into the processor 191. In some mobile devices, the processor 191 may include internal memory sufficient to store the application software instructions. For the purposes of this description, the term memory generally refers to all memory accessible by the processor 191, including the internal memory 192, the VSIM memory unit 193 and memory within the processor 191 itself. The internal memory 192 and the VSIM memory unit 193 may be volatile or nonvolatile memory, such as flash memory, or a mixture of both. In a preferred embodiment, the VSIM memory unit 193 is nonvolatile memory in order to retain the service contract provisioning data when the mobile device is turned off. Mobile devices also typically include a key pad 13 and menu selection buttons or rocker switches 12 for receiving user inputs.

Figure 3:
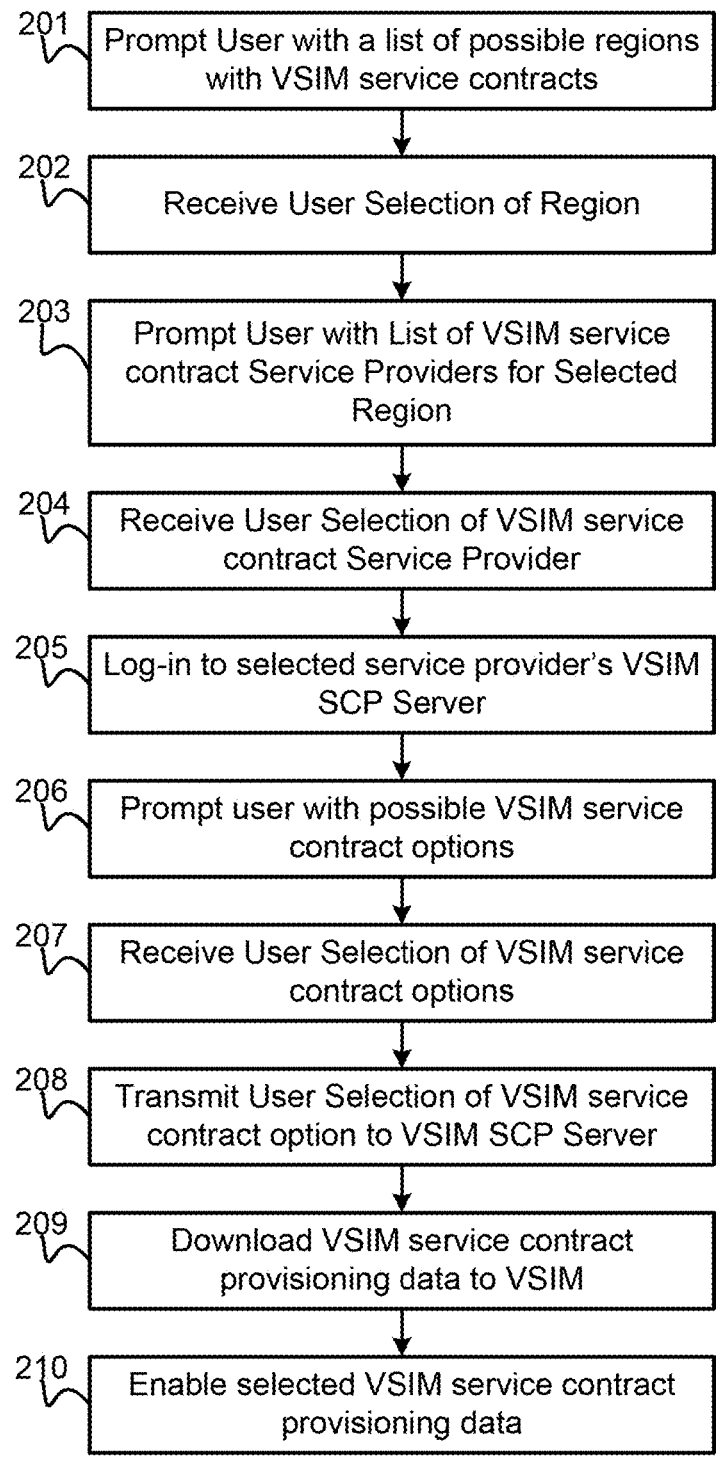
FIG. 3 is a process flow diagram illustrating method steps of an embodiment method for obtaining a VSIM service contract.

FIG. 3 illustrates a process flow of example method steps that may be performed to acquire VSIM service contract provisioning data. In operation, a mobile device 101 may be programmed with sufficient general provisioning data stored in the VSIM memory unit 193 which permits the mobile device 101 to connect with a wireless data network for the limited purpose of communicating with any of VSIM SCP servers 102-105. While the general provisioning data will not allow the mobile device 101 to establish normal communications, it will allow the mobile device 101 to connect with VSIM SCP servers 102-105 in order to purchase selected service contract provisioning data. Each VSIM SCP server 102-105 may be operated by a different service provider but some service providers may operate a number of VSIM SCP servers so as to offer different types of service contracts, address different regions or provide redundant capability. The mobile device 101 may have stored in its internal memory 192 or the VSIM memory unit 193 a list of server network addresses (e.g., IP address or URL) for servers of various carriers within different regions offering VSIM service contracts. These server network addresses and the corresponding service providers may be listed by region, country, or continent, for example.

Referring to FIG. 3, if the menu is organized by regions (versus service carrier) the list of possible regions may be displayed to the user on the mobile device display 11, step 201. This menu may be presented upon the occurrence of a variety of events including, but not limited to initial power-up, when a previously purchased VSIM PPSC has expired, or whenever the mobile device 101 determines that its current provisioning data will not operate in its current location. The user may select a region for which the user desires to purchase a VSIM service contract by using any of a variety of user interface keys 12, 13 and switches incorporated within the mobile device 101. The region selection is received by the mobile device processor 191, step 202, which in turn prompts the user with a list of possible VSIM service contract service providers for the selected region, step 203. Again using any of a variety of user interface keys 12, 13 and switches incorporated within the mobile device 101, the user selects a VSIM service contract service provider from the displayed list. The user selection of service contract service providers is received by the processor 191 of the mobile device 101, step 204. Based upon the received VSIM service contract service provider selection, the mobile device processor 191 accesses the corresponding server network address, initiates a communication link and logs in, step 205.

Once logged in to the appropriate VSIM SCP server (102-105), the mobile device may receive a list of VSIM service contract options and present these in a display prompting the user to make a selection, step 206. These VSIM service contract options may include PPSCs, MSCs and varying combinations of voice and data plans, as well as various durations or usage restrictions, for example. In response, the user selects a service contract option from the displayed list. The user's selection of a service contract option is received by the processor 191 of the mobile device 101, step 207, and transmitted to and received by the selected VSIM SCP server (102-105), step 208. Based upon the received selection, the service contract provisioning data is downloaded to the mobile device VSIM memory unit 193 by the VSIM SCP server (102-105) via the established data connection, step 209. Finally, the VSIM service contract is enabled and activated on the mobile device 101, step 210. The selected VSIM service contract may be enabled by loading the corresponding provisioning data into a VSIM provisioning data buffer 314 (see FIG. 7) or by directing the mobile device processor 191 to the memory location storing the corresponding provisioning data via a pointer list.

As part of the enabling and activation step, codes identifying the mobile device 101 may be transmitted to the selected VSIM SCP server (102-105) and stored with other VSIM service contract account data in either in the mass storage device of the VSIM SCP server (102-105) or in a corresponding VSIM SCP database 106-109. The stored mobile device identifying codes and service contract account data will allow the VSIM SCP service provider to monitor individual VSIM service contract accounts to enable communications so long as the VSIM service contract remains valid. As an alternative step (not shown), any of a number of well known electronic payment and e-commerce methods may be implemented to handle the exchange of funds prior to the downloading of provisioning data to the VSIM memory unit 193.

In order to establish and route wireless communication calls, conventional mobile devices and service networks are assigned special codes. These codes, which are described below, identify the individual mobile device 101 to the various communication networks and identify accessed networks to the mobile devices. Without the proper codes, no communication link may be established. Thus, to provide a mobile device 101 with a VSIM service contract, the network identifying codes are downloaded in the VSIM service contract provisioning data and the mobile devices' identifying codes are uploaded into the VSIM service contract account data stored in the mass storage device VSIM SCP server (102-105) or corresponding VSIM SCP database (106-109). The VSIM SCP server (102-105) handling the mobile device's 101 VSIM service contract account uses the mobile device's identifying code to validate the mobile device 101 each time it attempts to gain access to a communication network and monitor the mobile device's 101 usage in order to determine whether the VSIM service contract account is valid. For example, in instances where the VSIM service contract is a PPSC, the VSIM SCP server (102-105) may determine whether the VSIM PPSC has expired or not. If the VSIM PPSC has expired, the VSIM SCP server (102-105) may offer the user an opportunity to "re-charge" the VSIM PPSC account by purchasing more pre-paid service (e.g., purchasing more minutes), or deny the mobile device 101 access to a communication network after expiration if the user refuses to purchase more service time.

The identifying codes include:

(a) an Electronic Serial Number (ESN), which is a unique 32-bit number programmed into the mobile device when it is manufactured;

(b) a Mobile Identification Number (MIN), which is a 10-digit number derived from the unique phone number assigned to the mobile device;

(c) a System Identification Code (SID), which is a unique 5-digit number that is assigned to each wireless service provider by the FCC;

(d) a Preferred Roaming List (PRL) for CDMA-type mobile devices/Public Land Mobile Network (PLMN) for GSM-type mobile devices which is a priority listing of approved SID's which the service provider provides to the mobile device in order to determine which network SIDs the mobile device is allowed to utilize for service; and (e) an Authentication Key (A-Key) which is a shared secret key that can be generated after initial authentication.

While the ESN is typically considered a permanent part of the mobile device 101, the MIN, SID and PRL/PLMN are programmed into the VSIM 193 when a VSIM service contract is purchased and activated. In some embodiments the ESN may be programmed into the VSIM 193 as well. In such embodiments the ESN programmed on the VSIM may be checked as opposed to the mobile device 101 ESN. Each time a mobile device 101 accesses a communication network, either the ESN or MIN is checked by the VSIM SCP server to insure that the VSIM service contract is still valid. If the VSIM service contract is valid the VSIM SCP server will connect the communication request and begin decrementing the remaining time if the VSIM service contract is a PPSC account or increment the usage time if the VSIM service contract is a MSC. In this way, the service provider can insure that the mobile device 101 is only permitted access to the communication network in accordance with the terms of the VSIM service contract.

As part of the downloaded provisioning data, CDMA-type mobile devices are programmed with a PRL. GSM-type mobile devices are provisioned with a PLMN, which operates similar to the PRL. For simplicity, the embodiments are described using CDMA terminology. However, similar embodiment systems and methods may be implemented in GSM-type mobile devices in similar manner.

While a user of a mobile device 101 may purchase a VSIM service contract from a particular service provider, the service provider may have agreements with other service providers to enable its customers to utilize the communication networks of other service providers. This allows a service provider to provide its customers with a broader coverage zone without the need to install its own equipment across the entire coverage zone. In some situations this is sometimes referred to as "roaming" Thus, when a user purchases a VSIM service contract through a particular service provider, the user may be given access to and use of other service providers' communication networks. The PRL is a prioritized list of the alternative communication networks that a user may access if the primary communication networks are not available.

In any given region, multiple wireless and cellular communication networks may be operated by multiple service providers. Also, other private and/or non-commercial communication networks may be operating in a region. In order to determine which communication network a mobile device 101 may utilize in a given region, the mobile device 101 accesses the downloaded PRL for the selected service contract stored in the VSIM 193 to determine which channels or analog frequencies will be scanned and in what priority order to establish a communication link.

The PRL is maintained in such a manner that the mobile device can readily determine which communication networks cover common geographical regions. The references to common geographic regions refer to areas of common radio coverage. Moreover, the communication networks providing service in a common geographical region are prioritized, i.e., ranked from most desirable to least desirable. The mobile device is programmed to attempt to acquire service beginning with the available most desirable communication network in the mobile device's current geographical area. There is no point in trying to acquire service on a communication network outside of the mobile device's current geographic region since communication networks typically provide service only within a limited geographic region.

On many communication networks, regularly updating the PRL is advised if the user operates the mobile device outside the home system frequently, particularly if they do so in multiple different areas. This allows the mobile device to choose the best roaming carriers, particularly "roaming partners" with whom the home system has a cost-saving roaming agreement, rather than using non-affiliated carriers. PRL files can also be used to identify a home system along with roaming partners, thus making the PRL an actual list that determines the total coverage of the user, both home and roaming coverage.

Associated with each communication network in the PRL is a system ID (SID), as well as corresponding acquisition parameters (band, channel, etc.) for each communication network. The PRL is created, loaded and updated by the VSIM service contract service provider. When a user purchases and enables a VSIM service contract, the provisioning data that is downloaded into the VSIM 193 of the mobile device 101 replaces the previous PRL so that the SID and acquisition parameters for the new communication network is recognized by the mobile device 101.

The PRL is maintained by the service provider and is normally not accessible to the user. Many service providers provide the ability for the user to download the latest PRL to their device by dialing an Over-the-air (OTA) feature code, such as *228. Alternatively, the latest PRL may be downloaded into the mobile device via a hardwire connection. Similarly, the PRL may be updated to the VSIM 193 of the mobile device 101 via a network VSIM push of a user initiated download call, such as via *228.

The PRL includes two tables (along with some header and overhead information). The two tables are a System Table and an Acquisition Table. The System Table is a prioritized list of communication networks that the mobile device is permitted to access (home system and roaming networks). Each communication network entry in the system table belongs to a geographic area known as a GEO. Each entry also provides an acquisition table index where the frequencies associated with that particular communication network are identified and a roaming indicator that dictates the type of indication that should be displayed to the user when they are receiving service from that network. The Acquisition Table is an indexed list of frequencies on which the mobile device may search for particular networks. The acquisition table optimizes network acquisition time by identifying a limited number of frequencies that should be searched by the mobile device, rather than requiring the mobile device to search the entire frequency spectrum.

FIG. 4 illustrates an exemplary system table and acquisition table for a PRL for a particular geographic region. The Acquisition Table 152 contains records that list communication channels or frequencies in a priority contact order from top to bottom. For the Acquisition Table as shown, for example, a mobile device would contact PCS CDMA Block B channels first, then Block A channels, then channels 283, 699, 384, and 777. If the mobile device cannot contact these CDMA channels, the mobile unit would attempt to contact the network using Cellular Analog System A frequencies.

The PRL's System Table 151 contains records having several fields. The "SID" field contains the System Identification number of preferred communication networks. The "selection preference" identifies the relative priority of each network in terms of connection desirability. As shown, for example, it is more desirable for the mobile device to connect with the enabled VSIM service contract home system SID than any other network. The "Roaming Indicator" field indicates a roaming indication display status on the mobile device as either "off" or "on" depending on which network the mobile device is connected to. Typically, if the mobile device is connected to the home system of the enabled VSIM service contract, then the roaming indicator will be off. The "Acquisition Index" field refers back to the Acquisition Table record number associated with a SID. Thus, the "Acquisition Index" field entry indicates the channel(s) or frequency(ies) associated with the particular SID. As shown, for example, the SID of the home system (Acquisition Index 0) is associated with PCS CDMA Block B channels (Acquisition Table record 0). Similarly, SID of Roaming Partner 3 (Acquisition Index 3) is associated with Cellular Analog System frequencies (Acquisition Table record 3).

Thus, when the mobile device 101 downloads the VSIM service contract provisioning data (step 209) into the VSIM memory unit 193, the mobile device 101 downloads the PRL corresponding to the VSIM service contract. By downloading a PRL from the VSIM SCP server (102-105) and/or VSIM SCP database (106-109) into the VSIM memory unit 193 of the mobile device 101, the mobile device 101 is provided with all of the necessary parameters to establish a communication link with the communication network supporting the VSIM service contract.

Figure 5:
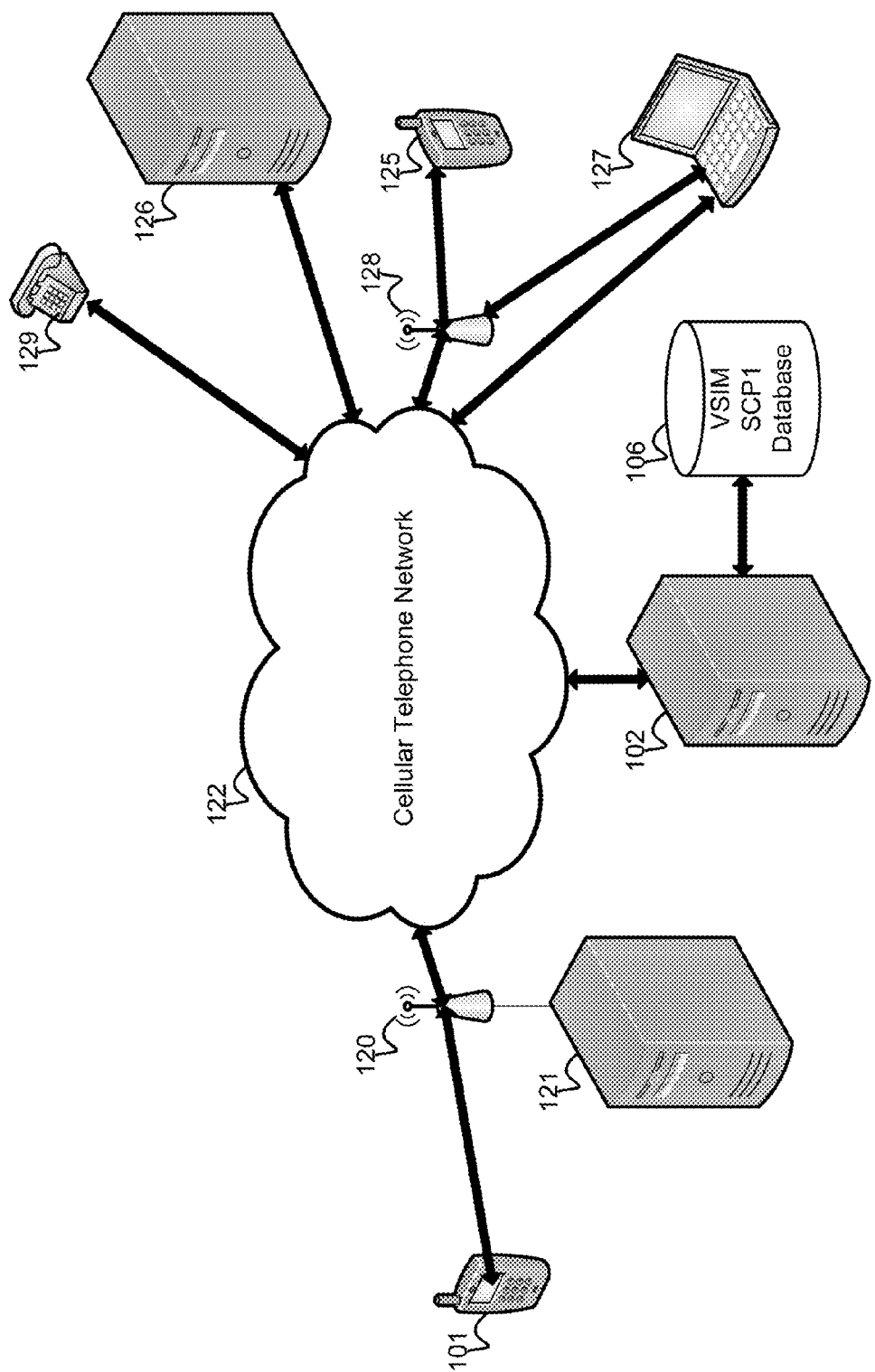
FIG. 5 is a system diagram of a cellular communication network implementing a VSIM service contract to connect a call.

FIG. 5 illustrates an exemplary system diagram of a mobile device 101 using a VSIM service contract to establish a call.

When a mobile device 101 selects a VSIM service contract account to establish a call, the mobile device 101 will locate the provisioning data for the selected VSIM service contract in the VSIM memory unit 193 and may copy the selected VSIM service contract PRL into the active call application memory. The VSIM memory unit 193 may contain the provisioning data for a plurality of VSIM service contracts. The selected VSIM service contract may be any of the varying types of VSIM service contracts offered on the VSIM SCP server (102-105) and/or VSIM SCP database (106-109). This step essentially swaps out the selected VSIM service contract PRL for the PRL previously in memory. Using the selected VSIM service contract PRL, the mobile device uses the listed frequencies to acquire a communication network via a base station 120 and make a request to complete a voice or data call. The base station 120 may be part of a communication network listed in the downloaded PRL that operates as a portal to the cellular telephone network 122. The base station 120 may be in communication with a server 121 that receives the communication request from the mobile device 101 via the base station 120. The communication request may include VSIM service contract account information indicating which service provider is supporting the selected VSIM service contract account and the EIN/MIN of the mobile device 101 making the communication request. Based upon the VSIM service contract account information, the communication request is routed via the cellular telephone network 122 to the VSIM SCP server (shown in FIG. 5 as 102) supporting the VSIM service contract account. The VSIM SCP server may refer to data stored in either the mass storage of the VSIM SCP server or a corresponding VSIM SCP database (106) to validate the VSIM service contract account and requesting mobile device 101. If the VSIM service contract account is still valid (e.g., there is sufficient access time remaining in the PPSC account or the MSC is still active), the VSIM SCP server (102) validates the VSIM service contract account and authorizes the connection of the mobile device 101 to its intended recipient. The intended recipient may be another mobile device 125, a server hosting data 126, a computing device 127, and/or landline telephone 129. The call may then be routed through the cellular telephone network 122 to the intended recipient. In instances where a wireless device (e.g., mobile device 125 or computing device 127) is the intended recipient, the call may be routed through a second base station 128. Alternatively, the intended call may be routed through the conventional telephone network 122 to the intended recipient via landline connections.

Figure 6:
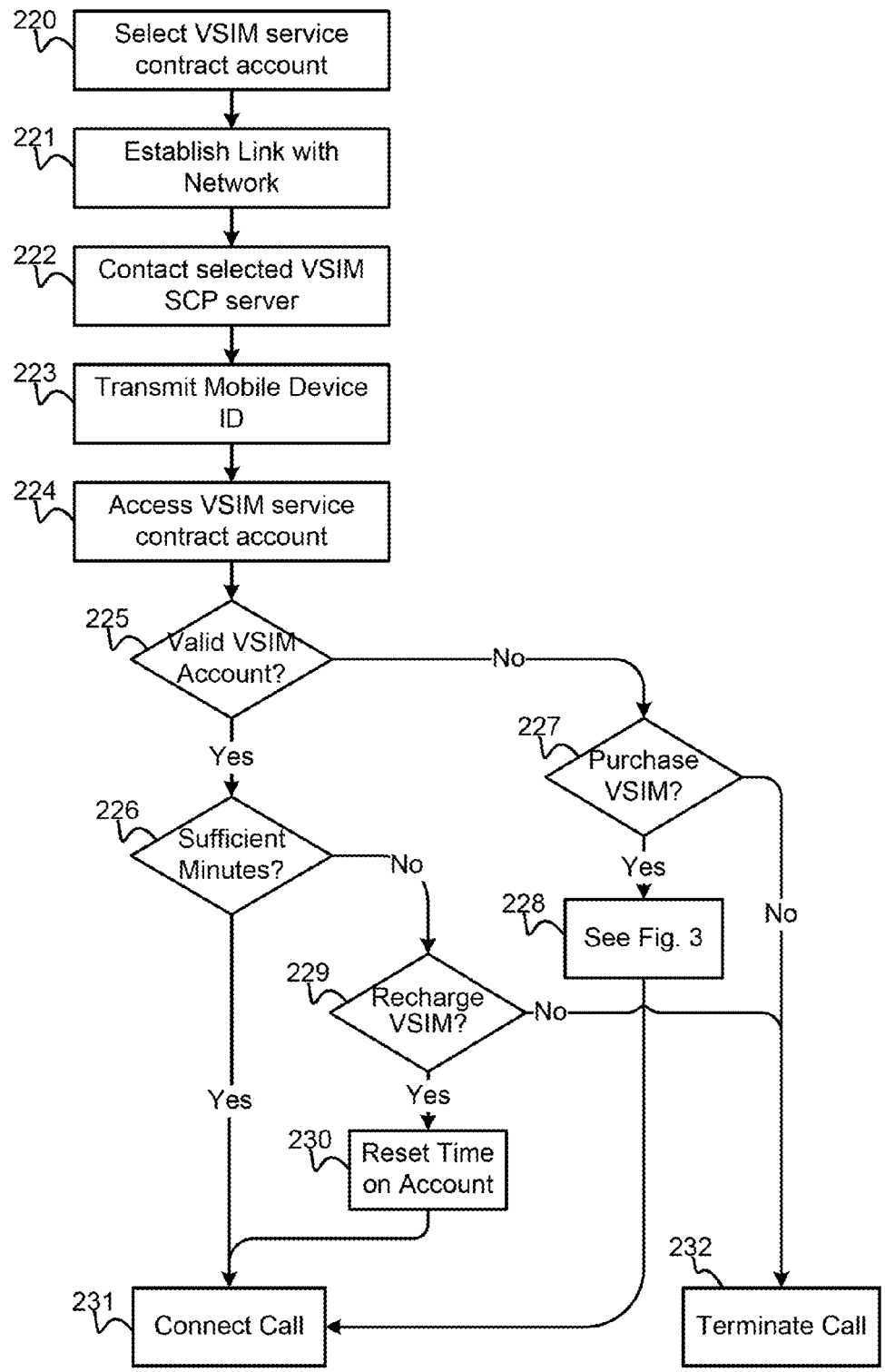
FIG. 6 is a process flow diagram illustrating steps of an embodiment method by which a mobile device completes a communication call using a VSIM service contract.

FIG. 6 illustrates a process flow of steps that may be performed to connect a call using a VSIM service contract. A user of a mobile device 101 may have a number of different VSIM service contract accounts stored in the mobile device VSIM memory unit 193. The user must first select which VSIM service contract account the user desires to implement to connect the call, step 220. By selecting the desired VSIM service contract account, the processor 191 retrieves the corresponding provisioning data from VSIM memory 193 and loads it into the active memory buffer 314 for use by the mobile device 101. Using the PRL data associated with the selected VSIM service contract account, the mobile device 101 will establish a communication link with an available communication network and make a call request, step 221. Based on the VSIM service contract account data included in the call request, the VSIM SCP server (shown in FIG. 5 as 102) may be contacted in order to validate the VSIM service contract account, step 222. To validate the VSIM service contract account, the relevant data identifying the VSIM service contract account and the mobile device 101 (EIN/MIN)

will be transmitted to the VSIM SCP server 102. Once the identifying information is received by the VSIM SCP server 102, the identifying data is used to access the VSIM service contract account data stored on either the mass storage device of the VSIM SCP server 102 or a corresponding VSIM SCP database 106. The VSIM SCP server 102 will check the VSIM service contract account data to insure that the VSIM service contract account is still valid, decision 225.

If the VSIM service contract account is not a valid account (i.e., decision 225=No) then the VSIM SCP server may optionally return a message to the mobile device 101 indicating that the VSIM service contract account is invalid and providing the user of the mobile device 101 with the option of purchasing a valid VSIM service contract account, decision 227. If the user responds in the affirmative (i.e., decision 227=Yes) then the mobile device and VSIM SCP server may implement steps 201-210 shown in FIG. 3 to allow the user of the mobile device 101 to purchase a valid VSIM service contract account, step 228. Thereafter, the newly activated VSIM service contract may be used to connect the call, step 231. Alternatively, if the optional step of providing the user with the ability to purchase a valid VSIM service contract account is not offered, then the call is simply terminated, step 232. Similarly, if the user declines to purchase a valid VSIM service contract account (i.e., decision 227=No), then the call is terminated, step 232.

If, however, the VSIM service contract account is valid (i.e., decision 225=Yes), then the VSIM SCP server 102 will determine if there are sufficient minutes left on the VSIM service contract account to support the call request, decision 226. In the case where the VSIM service contract is a MSC, this determination may entail determining whether there are sufficient "in-plan" minutes or if overage minutes apply. In the case where the VSIM service contract is a PPSC, this determination may entail determining if sufficient minutes are left on the PPSC. A pre-determined number of minutes threshold may be used to determine if "sufficient" minutes are available on the VSIM service contract account. If there are sufficient minutes left on the VSIM service contract account (i.e., decision 226=Yes), then the call is connected using the VSIM PPSC account data, step 231. The VSIM SCP server 102 will continue to monitor the call after it is connected to determine how many minutes should be counted against the VSIM service contract account once the call is completed. Alternatively, the VSIM SCP server 102 may decrement minutes from the VSIM PPSC account as the call proceeds so that the caller can be notified if the call results in the minutes remaining falling below the threshold during the call.

If there are not sufficient minutes left on the VSIM service contract account, such as if all prepaid minutes have been used or if all "in-plan" minutes have been used, (i.e., decision 226=No), the VSIM SCP server may send a message to the mobile device 101 indicating that the VSIM service contract account is expired or nearly expired and providing the user of mobile device 101 with an option to recharge the VSIM service contract account, decision 229. If the user elects to recharge the VSIM service contract account (i.e., decision 229=Yes), then the time remaining on the VSIM service contract account is reset or set to the number of additional number of minutes purchased, step 230, and the call is connected as requested, step 231. If, however, the user declines to recharge the VSIM service contract account, then the call request is terminated, step 232. In embodiments where the VSIM service contract account is an open-ended account (i.e., no limit on calling minutes), steps 226, 229, and 230 may be omitted.

In an embodiment, the VSIM SCP server may decrement time from the VSIM service contract while the call is ongoing. If the time remaining on the VSIM service contract account then falls below the threshold minutes, the VSIM SCP may alert the caller, such as by placing the call on hold and offering the caller an opportunity to recharge the account, step 229. If the user elects to purchase additional time, the account balance is reset accordingly, step 230, and the call continues (step not shown but similar to step 231). However, if the user elects not to purchase additional time (i.e., decision 229=No), the call may be terminated as soon as the remaining balance reaches zero, step 232.

Figure 7:
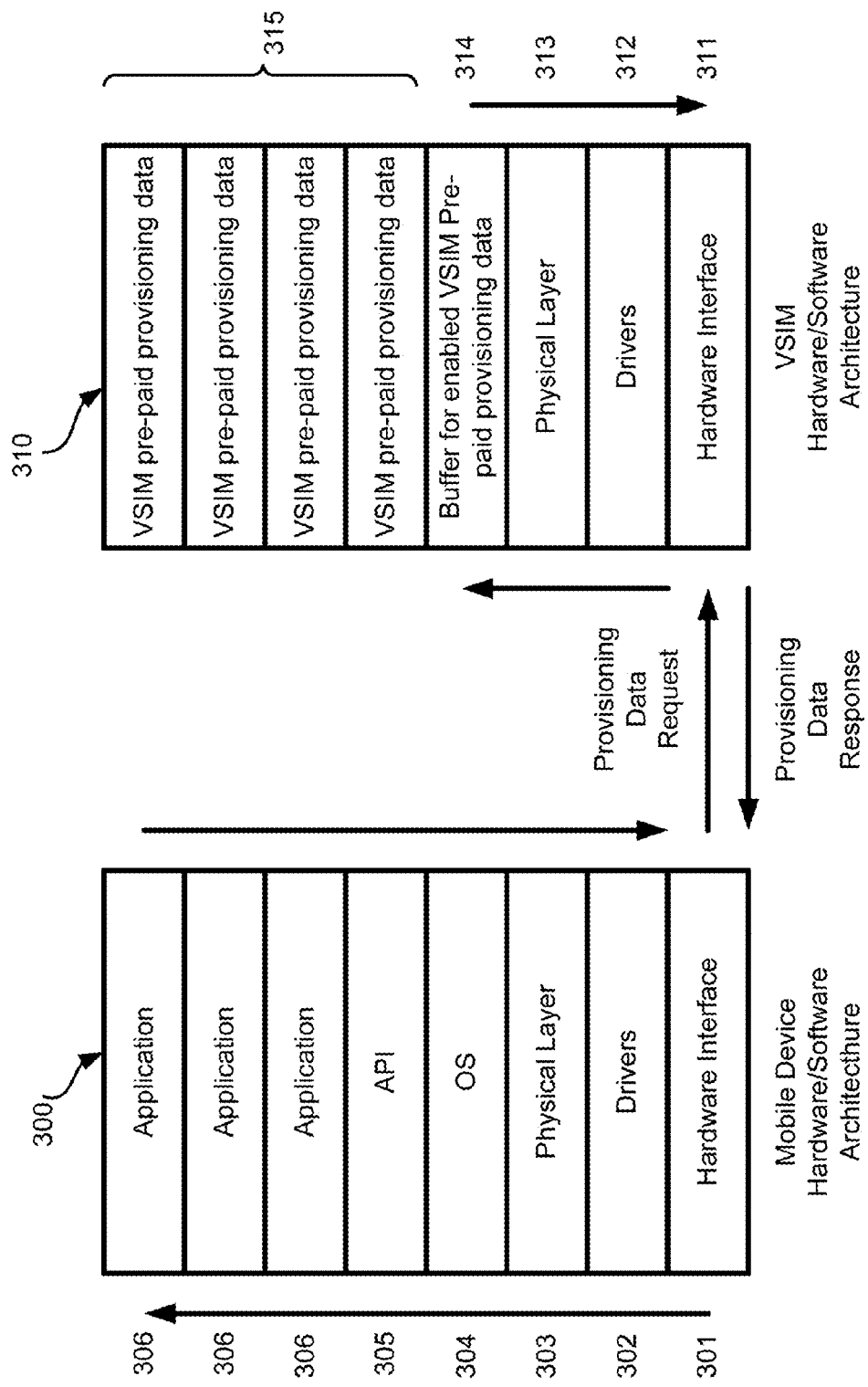
FIG. 7 is a hardware/software architecture diagram of the mobile device and VSIM illustrating the flow of data in a provisioning data request and response.

FIG. 7 illustrates a mobile device hardware/software architecture 300 in conjunction with a VSIM hardware/software architecture 310. When the mobile device 101 is functioning, various applications 306 operate on or request services from the mobile device's various hardware elements. For example, these hardware elements may include the processor and internal memory, input elements such as a keyboard or microphone, output elements such as the display or speaker (none shown) and communication units such as cellular transceivers, Global Positioning System (GPS) receivers, WiFi wireless transceivers, and Bluetooth local wireless transceivers. Some applications 306 may access the mobile device's cellular transceiver to initiate a telephone or data call. In order to initiate a telephone or data call, the application 306 will need to access the provisioning data stored in the VSIM memory unit 193. The application 306 requests this provisioning data through the hardware/software architecture 300 and 310. As illustrated in FIG. 7, applications 306 may communicate with the device operating system 304 via an API layer 305. The API layer 305 contains code that an operating system 304 provides to support requests for processor services to be made of it by the applications 306. The operating system 304 performs basic tasks such as controlling and allocating memory, prioritizing system requests, controlling input and output devices, facilitating networking and managing file systems. The operating system 304 communicates with the various device resources via the physical layer 303. The one or more driver layers 302 may be provided to control various device elements such as connected modems or transceivers. The driver layer 302 contains a specific type of computer software developed to allow interaction with a particular hardware element. Typically this constitutes an interface for communicating with the specific hardware element, through the specific computer bus or communications subsystem that the hardware element is connected to, providing commands to and/or receiving data from the hardware element, and on the other end, the requisite interfaces to the operating system 304 via the physical layer 303. The hardware interface 301 comprises the physical connections with the hardware device such as the socket or receptacle that the hardware element plugs into.

In the various embodiments, when an application 306 running on a mobile device 101 requests provisioning data stored in the VSIM memory 315, the data request propagates through the device hardware/software architecture 300 until the request reaches the hardware interface layer 301 and enters into the VSIM hardware/software architecture 310 via the VSIM hardware interface 311. This data access request may be by direct memory access and/or General Purpose Input/Output (GPIO). The VSIM hardware interface layer 311 may comprise the connector pins which may be the physical connection plugging the VSIM 193 into the mobile device 101 or it may be the bus connection that the VSIM 193 is connected to when the VSIM is built into the internal memory 192 of the mobile device 101. Once received in the VSIM hardware layer 311, the request for the provisioning data corresponding to the currently active VSIM service contract in the VSIM memory 314 that originated in the applications 306 propagates up the hardware/software architecture 310. The driver 302 accesses the VSIM data via the hardware interface 311 and provides the information to the applications. Alternatively, the data request is communicated from the hardware interface 311 to the driver layer 312. As above, the driver layer 312 contains a specific type of computer software developed to allow interaction between the VSIM memory unit 193 in the physical layer 313 to the hardware interface 311. The data request then accesses data in the enabled VSIM provisioning data buffer 314, which is a memory block used to hold the provisioning data for the service provider currently selected for use. As a result, the currently selected VSIM service contract provisioning data 314 is accessed and the requested information pass back to the requesting application 306 in a reverse manner. The VSIM provisioning data buffer 314 may be an implementation of an embedded file system or secured file system. The embedded file system provides the operating system (OS) abstraction to access the VSIM data as a logical file. A secured file system provides an additional level of protection against spoofing of VSIM data through software or hardware encryption.

As described above, the VSIM memory unit 193 may contain a plurality of VSIM service contract account provisioning data sets 315 for different VSIM service contract accounts purchased by the user. When the user selects a particular one of the stored VSIM service contract accounts for use, such as a VSIM service contracts providing voice call services, the mobile device processor 191 accesses the selected VSIM provisioning data 315 via the access layers 311-313 as described above and copies the provisioning data into the enabled VSIM provisioning data buffer 314. Thereafter, access requests received from applications will be provided provisioning data from the enabled VSIM provisioning data buffer 314.

Alternatively, the provisioning data corresponding to each of the plurality of VSIM service contract accounts may be separately stored in locations within the VSIM memory unit 193. The mobile device processor 191 may maintain an enabled VSIM pointer in a buffer which points (by holding the memory address of the corresponding data) to the currently enabled VSIM service contract provisioning data. As different VSIM service contracts are selected to complete a voice or data call, the enabled VSIM pointer stored in the pointer buffer is changed to direct the mobile device processor 191 to memory location within the VSIM memory unit 193 of the currently selected VSIM service contract provisioning data.

The hardware/software architecture 300 and 310 illustrated in FIG. 7 is meant only as an illustration of one example organization of data and software for implementing the various embodiments. As will be appreciated by one of skill in the art of cellular handheld device design and programming, other software/hardware architectures may be used with equal effectiveness.

Figure 8:
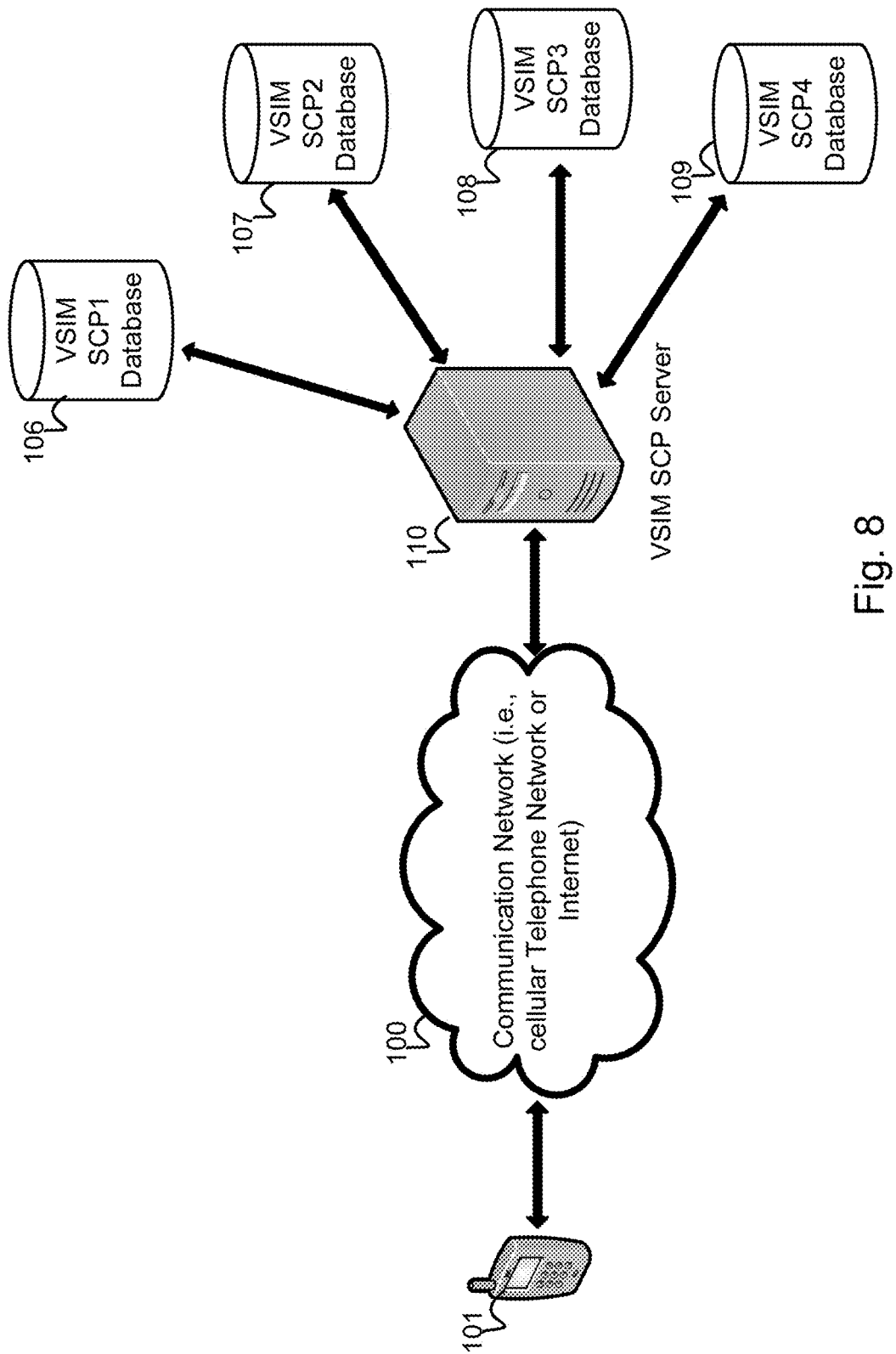
FIG. 8 is a system diagram illustrating an alternative embodiment communication system in which a mobile device may obtain a VSIM service contract.

An alternative embodiment for providing VSIM service contract accounts is shown in FIG. 8. In this alternative embodiment, a single VSIM SCP server 110 acts as a central server to a plurality of VSIM SCP databases 106-109. For example, a mobile device 101 may connect to a single central VSIM SCP server 110 via a communication network 100. The single central VSIM SCP server 110 may communicate with a plurality of VSIM SCP databases (106-109) to allow the mobile device 101 to connect with a single VSIM SCP server 110 and obtain VSIM service contract accounts from a variety of service providers. As with the previous embodiment, the VSIM SCP databases 106-109 each contain the necessary provisioning data for each VSIM service contracts offered by each of the respective service providers. By providing a central VSIM SCP server 110, this embodiment may be used to permit users to be assigned a single telephone number even though the user may maintain a variety of VSIM PPSC and MSC accounts. It should be noted that the single central VSIM SCP server 110 may be a regional server and that the mobile device 101 may connect with multiple central VSIM SCP servers depending upon which particular region the mobile device 101 is currently located. For example, if the mobile device 101 is currently located in Europe, the mobile device 101 may connect with the VSIM SCP server 110 servicing Europe. Similarly, a central VSIM SCP server 110 may be situated in other geographic regions (e.g., Asia, Western Asia, Eastern Asia, Africa, South America, etc.). Regional VSIM SCP servers 110 may service geographic regions of varying size depending on the number of mobile device 101 operating within the region. As more and more mobile devices are operating within a region, the size of the region serviced by a single VSIM SCP server 110 may decrease in size and vice versa.

Figure 9:
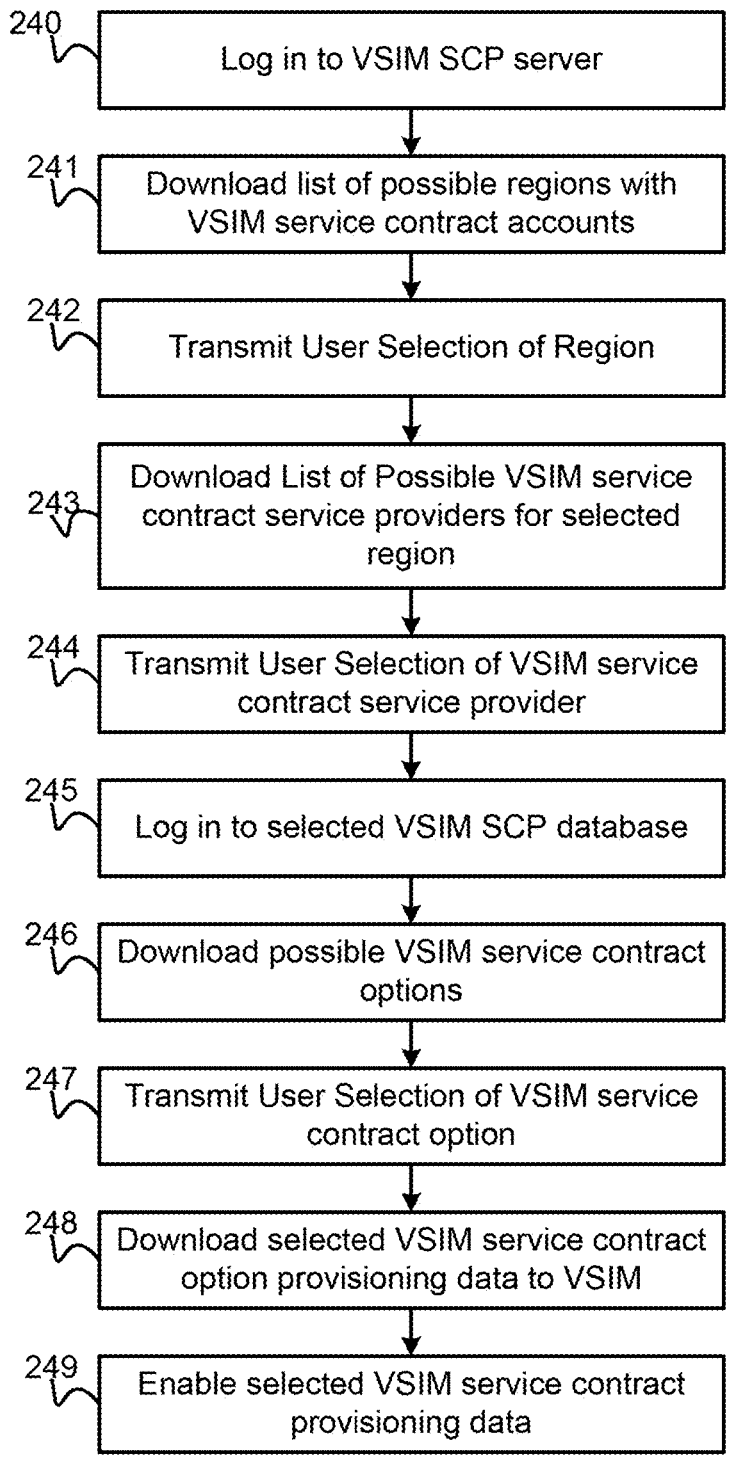
FIG. 9 is a process flow diagram illustrating steps of an alternative embodiment method for obtaining a VSIM service contact.

FIG. 9 illustrates alternative method steps that may be implemented to acquire a VSIM service contract account. In this embodiment, a single central VSIM SCP server is connected to a plurality of VSIM databases. Each of the plurality of VSIM databases is operated by a separate service provider to provide users with the ability to purchase any of the variety of VSIM service contracts that the service provider offers. In this embodiment, users connect to the central VSIM SCP server which in turn connects to a selected service provider's independent VSIM database to purchase a VSIM service contract offered by the selected service provider. In instances where the mobile device 101 is operating in an embodiment system such as the one shown in FIG. 8, where a single VSIM SCP server 110 connects to a plurality of VSIM SCP databases 106-109 operated by independent service providers, additional mobile device 101 internal memory 192 may not be required to store multiple server network addresses as in other embodiments. Rather, the user of mobile device 101 may simply connect with a single VSIM SCP server 110 each time the user wishes to purchase a new VSIM service contract, so only the one server VSIM SCP network address is stored in memory. For example, if the user is planning to travel internationally, before the trip the user can log onto the VSIM SCP server 110 to purchase a PPSC for each country to which the user intends to travel. In instances where the VSIM SCP server 110 is being hosted by the user's conventional service provider, the additional VSIM service contracts could simply be billed to the user's long term account.

In the embodiment illustrated in FIG. 9, a communication link between the mobile device 101 is established with the VSIM SCP server 110, step 240. Once the mobile device 101 has logged into the VSIM SCP server 110, the mobile device 101 downloads and displays a list of regions for which the user may purchase a VSIM service contract account through the VSIM SCP server 110, step 241. These regions may be listed, for example, by region, country, or continent. The user may select the region that the user desires by using any of a variety of user interface keys 12, 13 and switches incorporated within the mobile device 101. The user selection is transmitted to the VSIM SCP server 110, step 242. Based upon the user selection, the VSIM SCP server 110 downloads a list of possible VSIM service contract providers for the selected region to the mobile device 101 for display to the user, step 243. Again using any of a variety of user interface keys 12, 13 and switches incorporated within the mobile device 101, the user selects a VSIM service contract provider from the displayed list. The user's selection of VSIM service contract providers is transmitted to the VSIM SCP server 110, step 244.

Based upon the received selection, the VSIM SCP server 110 initiates a communication link with the VSIM SCP database (106-109) corresponding to the selected VSIM service contract provider, step 245. Once logged in to the appropriate VSIM SCP database (106-109), the list of VSIM service contract options is downloaded and transmitted to the mobile device 101 for display to the user, step 246. These VSIM service contract options may provide varying combinations of voice, data, voice and data plans, as well as varying durations of access. Using any of a variety of user interface keys 12, 13 and switches incorporated within the mobile device 101, the user selects a VSIM service contract option from the displayed list. Alternatively, the VSIM service contract may be automatically selected by the mobile device processor 191 using a user specified profile to determine when and which VSIM service contract to select. The VSIM service contract selection is transmitted to and received by the selected VSIM SCP database (106-109) via the VSIM SCP server 110, step 247.

Based upon the transmitted selection, the VSIM service contract provisioning data is downloaded from the VSIM SCP database (106-109) to the VSIM SCP server 110 which transmits the information to the mobile device 101 which stores the information in the VSIM memory unit 193, step 248. Finally, the VSIM service contract is enabled and activated on the mobile device 101, step 249. As part of the enabling and activation step, codes identifying the mobile device 101 may be transmitted to the selected VSIM SCP database via the VSIM SCP server 110 to be stored with the other VSIM service contract account data in the selected VSIM SCP database 106-109. Storing the identifying code and account data will allow the VSIM service contract provider to monitor individual VSIM service contract accounts and enable communications so long as the VSIM service contract is valid. As an alternative step (not shown), any of a number of well known electronic payment and e-commerce methods may be implemented to handle the exchange of funds prior to the downloading of provisioning data to the mobile device 101.

In other embodiments, some service providers may elect to operate their own independent VSIM SCP servers 102-105 (see FIG. 1) and VSIM databases 106-109, while other service providers operate an independent VSIM database 106-109 connected to a central VSIM SCP server 110. In such an embodiment, the system may contain both independent and central VSIM SCP servers. In such an embodiment, the process flow shown in both FIGS. 3 and 8 may be implemented depending upon which VSIM SCP server (independent or central) hosts the selected service provider's VSIM service contract.

Figure 10:
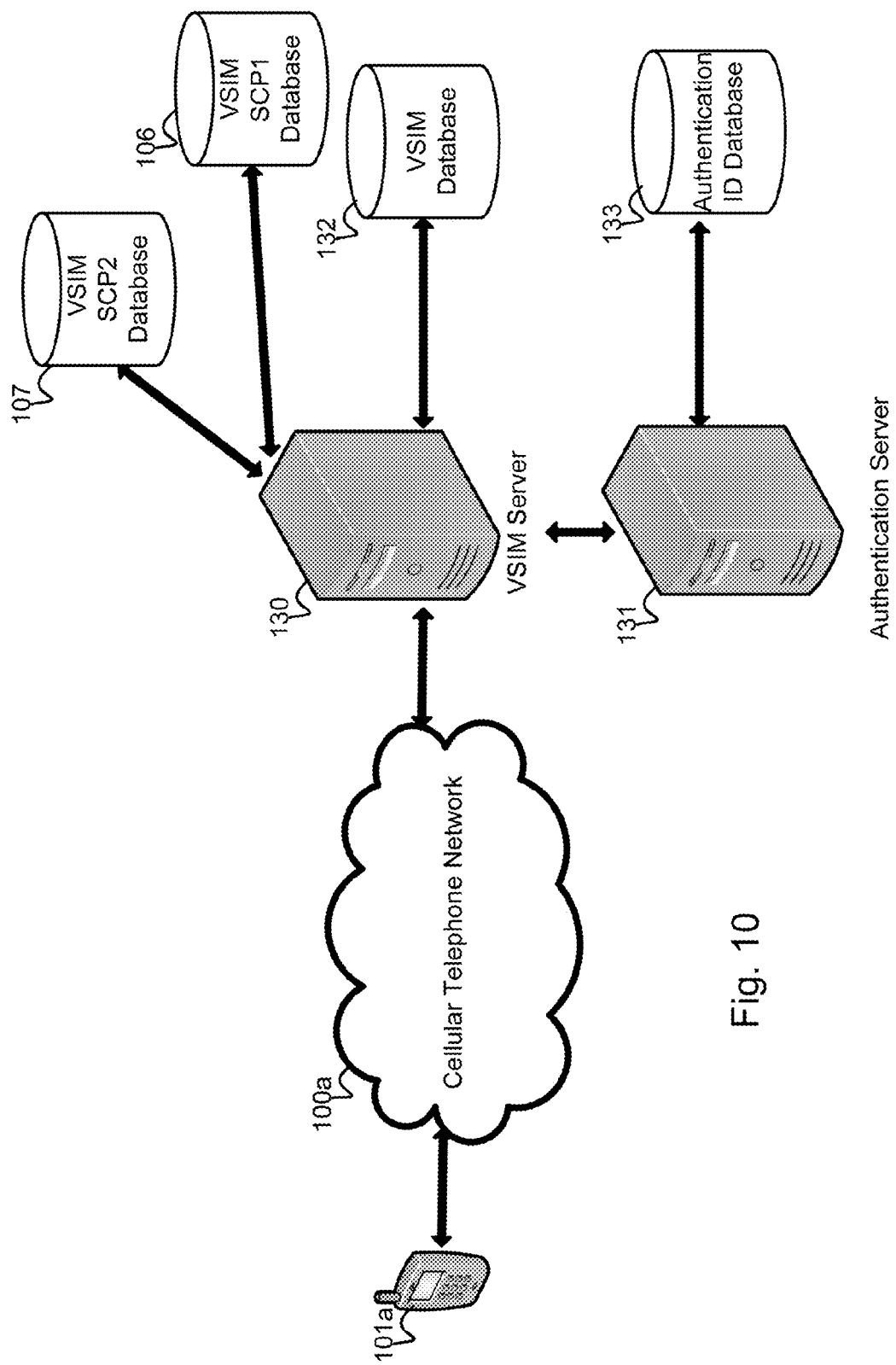
FIG. 10 is a system diagram illustrating an alternative embodiment communication system in which a mobile device may obtain a VSIM service contract as well as personal data stored in a remote VSIM server/database.

An alternative embodiment for providing both VSIM service contract accounts as well as user personal VSIM data is shown in FIG. 10. In instances where users do not have their personal mobile device 101 on hand, users may rent or borrow a mobile device 101*a*. In other instances, a user may purchase a disposable mobile phone. In any case, when users are without their own mobile device 101 they may require not only a VSIM service contract account but also access to the personal data stored on their own mobile device 101. In other instances, users may have their own mobile device 101, but have lost personal data from the internal memory 192 of the mobile device 101. This alternative embodiment system and method allows users to access a VSIM service contract account and download personal data that has been backed up on a remote VSIM storage unit 130/132. A more complete description of the remote VSIM storage unit 130/132 is provided in U.S. patent application Ser. No. 11/963,918 entitled "Virtual SIM card for Mobile Handsets", the entire contents of which are hereby incorporated by reference. For sake of simplicity, FIG. 10 and the description herein discusses the borrowed, rented or purchased mobile device 101*a*. However, a user may also implement the embodiment method and system using the user's personal mobile device 101.

FIG. 10 illustrates an overall architecture of an embodiment wherein a rented or purchased mobile handset 101*a* communicates over a cellular telephone network with a VSIM server 130 to send and receive both VSIM service contract provisioning data and backed up personal data. A mobile device 101*a* may be programmed with general provisioning data stored in an internal memory unit 192 which permits the mobile device 101*a* to communicate with a VSIM server 130 over a cellular telephone network 100*a*. The VSIM server 130 may be coupled to an authentication server 131 such as by way of a wired, fiber optic or wireless network connection. The VSIM server 130 may contain internal memory storage units such as a mass storage disc drive, or may be in connection with a VSIM database 132, which is capable of storing the personal data information for each individual mobile handset operating on the system. Similarly, the authentication server 131 may contain internal memory storage units such as mass storage disc drives, or may be connected to an authentication database 133, which is capable of storing the authentication credentials for each individual VSIM account operating on the system. In an embodiment, the VSIM server 130 may also act as the authentication server 131 by incorporating authentication functions within the VSIM server software and providing sufficient memory storage units.

Since sensitive personal data, mobile device provisioning information, and authentication and verification information, may be transmitted back and forth between the mobile handset 101*a* and the VSIM server 130, the VSIM server 130 and the mobile device processor 191 can be configured with software to encrypt such information using known data encryption and key methods to protect data from unauthorized viewing. Information stored in the VSIM 193 is backed up and maintained on the external VSIM server 130.

The VSIM services provided by the VSIM server 130 may be offered to mobile device users as a standard feature of service or as an extra subscription fee service. This architecture allows the provisioning and personal information to be uploaded to the VSIM memory unit 193 at any time, providing flexibility in provisioning and programming new mobile devices. This architecture also provides users with an external backup of personal data which preserves their personal data even if the entire mobile device 101 is lost. By logging onto the VSIM server 130 via the cellular telephone network, users may backup their personal data to the VSIM server 130 and/or VSIM database 132. Then, even if the entire mobile device 101 is lost or destroyed, their personal data is preserved, ready for reloading onto a replacement mobile device.

To restore their personal data or to move their personal data to a rented or borrowed mobile device provisioned with a VSIM service contract, users log onto the VSIM server 130 via the cellular telephone network, authenticating themselves by transmitting authentication credentials for comparison against authentication credentials previously stored in the authentication database 133. Authenticated users are able to restore their personal data and, optionally, provisioning information to a replacement, rented or mobile device by having the information downloaded directly into the VSIM memory unit 193. Users who are not authenticated are denied access to the VSIM database 132. In addition, the VSIM server 130 may act as a central VSIM SCP server similar to the central VSIM SCP server 110 described above with reference to FIG. 9 by being connected to at least one VSIM SCP database (106, 107) to permit users to purchase a VSIM service contract.

Figure 11:
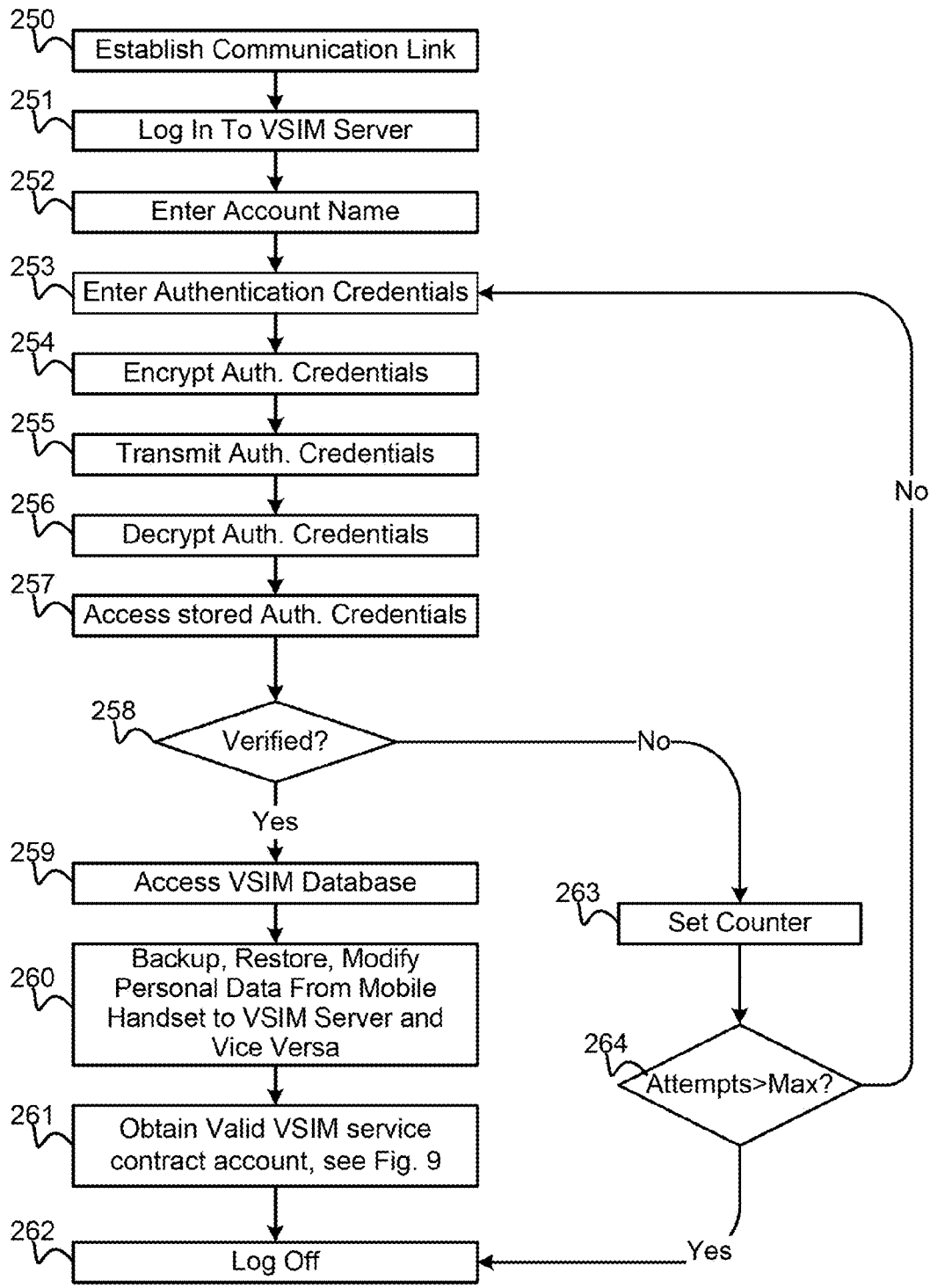
FIG. 11 is a process flow diagram illustrating steps of an alternative embodiment method for obtaining a VSIM service contract as well as personal data stored in a remote VSIM server/database.

FIG. 11 illustrates an overview of a process for purchasing a VSIM service contract and retrieving personal data stored in a VSIM server 130 and/or VSIM database 132 to the mobile device 101a. Upon power up of the mobile device 101a or any other interval preset by the user or service provider, the mobile device 101a establishes a wireless communication link via a cellular telephone network to the VSIM server 130, step 250. Once the communication link has been established, log in to the VSIM server 130 is accomplished, step 251. As part of the login process, the user may be prompted to enter the user's account information via the mobile device 101a keyboard, step 252. The account name may be automatically received by the VSIM server 130, such as if the phone number associated with the mobile device 101a is used as the user account name. The user may also be prompted to enter authentication credentials, step 253. Any of a number of authentication credential forms may be employed, including password verification, biometric recognition, and combinations thereof. Once entered into the mobile device 101a, the authentication credentials are preferably encrypted by the mobile device 101a processor and transmitted via the cellular telephone network to the VSIM server 130, step 254, which may transmit the data to the authentication server 131, step 255.

The VSIM server 130 and/or authentication server 131 decrypts the received user account and authentication credential data, step 256. The processor of either the VSIM server 130 or authentication server 131 accesses the stored authentication credentials associated with the user accounts, step 257. The decrypted received authentication credentials are compared to authentication credentials previously stored in the authentication database 133 to authenticate the user and verify that an authorized user is attempting to log in, decision 258. If the authentication credentials match (i.e., decision 258=Yes), the user is authenticated and access is granted to the user account files stored within the VSIM database 130, step 259.

Once access has been granted, the user may upload/backup personal data from the mobile device 101a VSIM to the VSIM database 132 via the VSIM server 130, or restore personal data to the mobile device 101a memory, step 260. During a backup procedure, personal data is transmitted from the VSIM memory unit 193 of the mobile device 101a to the VSIM database 132 via the VSIM server 130. During the restore operation, personal data is transmitted from the VSIM database 132 to the mobile device 101a and stored in its VSIM memory unit 193. The user may also perform other operations, such as modifying personal data stored within the VSIM database 132. A data modification procedure may be similar to the backup procedure. So long as access is granted to the user, personal data may flow from the mobile device's 101a VSIM memory unit 193 to the VSIM database 132 via the VSIM server 130 and vice versa.

Once the user has completed the desired personal data backup, restore, modify procedures, step 260, the mobile device 101a may obtain and use a VSIM service contract account to complete voice and data calls. The mobile device 101a may implement the process flow shown in FIG. 9 to allow the user of mobile device 101 to select and purchase a valid VSIM service contract account via a central VSIM server 130, step 261. Once the VSIM service contract provisioning data has been downloaded, the mobile device 101a may log off from the VSIM server 130, step 262.

If, when presented, the authentication credentials do not match, the authentication server 131 will deny access to the VSIM database 132 via the VSIM server 130. As shown in FIG. 11, a flag may be set or a count established to record the number of unsuccessful authentication attempts, step 263. If the number of unsuccessful authentication attempts exceeds a preset number (i.e., decision 264=Yes), the user may be logged off by the VSIM server 130, step 262. Otherwise if the number of unsuccessful authentication attempts is less than the preset number (i.e., decision 264=No), the user may be prompted to attempt to authenticate again, step 253. In alternative embodiments, the method may simply allow unlimited authentication attempts, in which case it would not be necessary to perform the initiate counter step 263 or determine if too many attempts had occurred as in decision 264.

As discussed above, to insure quality of service (QOS), service providers may often update the PRL as the mobile device 101 moves within a coverage zone or from one geographic area to another. Because different communication networks operate in different geographic areas it is important to update the selected VSIM service contract PRL to insure that as the mobile device moves into different geographic areas the list of possible communication networks that it may connect to is accurate. The updated VSIM service contract PRL may re-prioritize the listing of available VSIM service contract supported networks or may revise the list to include or remove other networks from the list depending on the current location of the mobile device 101.

While each VSIM service contract service provider attempts to maintain a high QOS for its customers, in some instances a VSIM service contract service provider may simply not provide its customers with access to the appropriate communication networks in a geographic area to provide a high QOS. Thus, merely updating the PRL may not be sufficient to provide the customer with a high QOS (or any service). For example, while a service provider may operate in North America, the service provider does not provide its customers with access to communication networks in Europe. In order to obtain a high QOS, the user may have to switch service providers entirely. By maintaining multiple VSIM service contract accounts on the mobile device's VSIM memory unit 193, a user may quickly enable a new VSIM service contract account, such as by copying provisioning data of the selected new VSIM service contract account into the enabled VSIM provisioning data buffer 314. This swap out of VSIM service contract account data activates a new VSIM service contract account PRL to enable the mobile device 101 to access locally available communication networks.

Location may not be the only operational parameter value which suggests a change in VSIM service contract accounts. It may be beneficial to change VSIM service contract accounts when the mobile device is attempting different types of communication usage requests. For example, a particular VSIM service contract provider's communication network may be especially well suited to handle high speed data calls. However, access to the particular VSIM service contract provider's communication network may come at a premium expense. Accordingly, it would not be cost efficient to utilize the particular VSIM service contract provider's communication network for simple voice calls or data calls where the high speed capability is not required. In an embodiment method, when a mobile device 101 attempts to make a high speed communication data call, such as for Mobile TV or the downloading of large multimedia data files, the mobile device 101 may enable the VSIM service contract account supported by the particular service's provider communication network. In instances where the mobile device 101 is attempting to make a medium speed data call, such as for web browsing, a different VSIM service contract account might be enabled. In other instances where the mobile device 101 is attempting to make low speed data calls such as for MMS, yet another VSIM service contract account might be enabled. Different VSIM service contract accounts may be selected to support different communication usage requests. Alternatively, a different VSIM service contract account may be selected to support different provisioned services. For example, a different VSIM service contract account might be used to support: GSM only, GSM and GPRS, UMTS only, GSM, GPRS, UMTS, 1× only, 1× and EvDO. Additional VSIM service contract accounts may be stored to a mobile device's 101 VSIM memory unit 193 to support additional provisioned services. By storing various VSIM service contract account's provisioning data in a VSIM memory unit 193, such switching among alternative VSIM service contract accounts can be accomplished rapidly without the need to contact a VSIM SCP server.

In addition to location, communication usage request or service request, a VSIM service contract account may be selected based upon time of day, day of week, or even time of the year operational parameter values. Some service provider's communication networks may receive increased call volume during certain times of the day, days of the week, or even time of the year. The increased call volume may result in a decrease in QOS.

While switching between VSIM service contracts stored in a VSIM memory unit 193 is more convenient than physically switching SIM cards in a mobile device, the constant need to manually select which VSIM service contract to enable may be cumbersome to some users. Various embodiments allow the mobile device 101 to automatically select the VSIM service contract based upon a user profile.

In the various embodiment, a mobile device may be configured with software and user specified profiles to automatically switch between VSIM service contracts when various user specified criteria category values are satisfied. If the criteria values specified in an activated user profile are not satisfied then the mobile device will not switch VSIM service contracts. Each user profile may specify which specific VSIM service contract to enable based upon a variety of user specified criteria category values. Alternatively, each user profile may specify a priority list of multiple VSIM service contracts to enable based upon a variety of user specified criteria category values. The priority list of multiple VSIM service contracts being a hierarchy of possible VSIM service contracts to enable. While a user may wish to enable a particular VSIM service contract for a given set of conditions, in some situations communication over the network supporting that particular VSIM service contract may not be possible. For example, the network supporting the particular VSIM service contract may be temporarily overloaded with call volume, or atmospheric or other interference may prevent an adequate communication link with the network, or the network has been damaged. Rather, than requiring the user to enable a wholly new user profile to select a different VSIM service contract, the user may specify multiple VSIM service contracts which are listed in a prioritized list. The priority is the order in which the user specifies the mobile device 101 to enable each listed VSIM service contract. In instances where the VSIM service contracts with the highest priority in the list are not available, the mobile device 101 may enable the next highest priority VSIM service contract until either the mobile device 101 is able to connect with a network supporting one of the listed VSIM service contracts or the priority list is exhausted and no network is available.

By implementing user profiles, a VSIM service contract may be automatically selected and enabled under certain criteria category values based upon a user preference. The various embodiments allow a user to customize both the criteria category values and priority list of possible VSIM service contracts to enable. In some cases, the user may have a specific purpose or reason to a use a particular VSIM service contract to support a communication call that is counterintuitive or predicated on other goals totally unrelated to QOS or cost efficiency. For example, a business may provide its employees with a VSIM service contract to conduct business voice and data calls. The provisioning information supporting this "business" VSIM contract may be stored in the VSIM memory unit 193. The user may desire to conduct personal calls on the same mobile device 101, but does not want the cost of such personal calls to be recorded or charged against the business VSIM service contract. Accordingly, the user may decide to purchase a separate VSIM service contract for personal use. The provisioning information supporting this "personal" VSIM service contract may also be stored in the VSIM memory unit 193. In an embodiment the employee may then create a user profile such that the mobile device 101 automatically selects and enables the "business" VSIM service contract during business hours and automatically reverts back to the "personal" VSIM service contract during off-business hours. Under the user profile, the "business" VSIM service contract will automatically be selected and enabled during business hours even though the network supporting the user's "personal" VSIM service contract might provide the user with a more cost efficient or better QOS solution to conduct the voice or data call. In this user profile, the criteria category is time, and the criteria category value is "business hours," such as 8:00 am to 5:00 pm.

In alternative embodiments the user may customize a user profile based upon a variety of criteria category values, not just time. Some of the most common criteria category values may allow a user to specify which VSIM service contract to enable based upon location, time, and/or application. For example, the user may specify a user profile such that when the mobile device detects that it is in a particular location a specific VSIM service contract is selected and enabled. As another example, the user may specify a user profile such that when the mobile device is attempting to conduct a call related to a specific application a specific VSIM service contract is selected and enabled. For example, if the user attempts to send an e-mail, the mobile device may recognize the email application and accordingly select and enable a specific VSIM service contract based upon the application. Alternative embodiments may allow the user to create a user profile which specifies a particular VSIM service contract(s) to enable based upon any combination of criteria values. For example, a user profile may specify a particular VSIM service contract to enable when the mobile device is in a specified location, during a specified time period, and/or when a specified application is implemented.

In another embodiment, a user may simply specify a priority list of VSIM service contracts without specifying any criteria category values. In this embodiment, the user simply prefers to select and enable one VSIM service contract over all others for all situations. However, by specifying the priority list the user may dictate which VSIM service contract to enable in the event the network supporting the most preferred VSIM service contract is unavailable. By ranking each VSIM service contract in a priority list, the mobile device is provided with the order of VSIM service contracts the user desires the mobile device to utilize in its attempts to conduct the call.

In still other embodiments, other additional criteria category values may be specified by the user. For example, a user may specify a particular VSIM service contract to enable based upon which phone number, email address, or web address is inputted. In this manner, a user might insure that calls to a particular client or contact are charged to an appropriate VSIM service contract. For sake of simplicity, the foregoing will describe embodiments that include criteria categories of time, location and application. However, the various embodiments should not be limited to these specific criteria categories. It is also noted that the various embodiments do not require use of all of these criteria categories. A user may specify a profile based upon none, one, or a combination of some or all of the criteria categories. For example, a user may specify a particular VSIM service contract to use regardless of location, time, application, or any other criteria. In this case, no criteria would be specified in the user profile.

Figure 12:
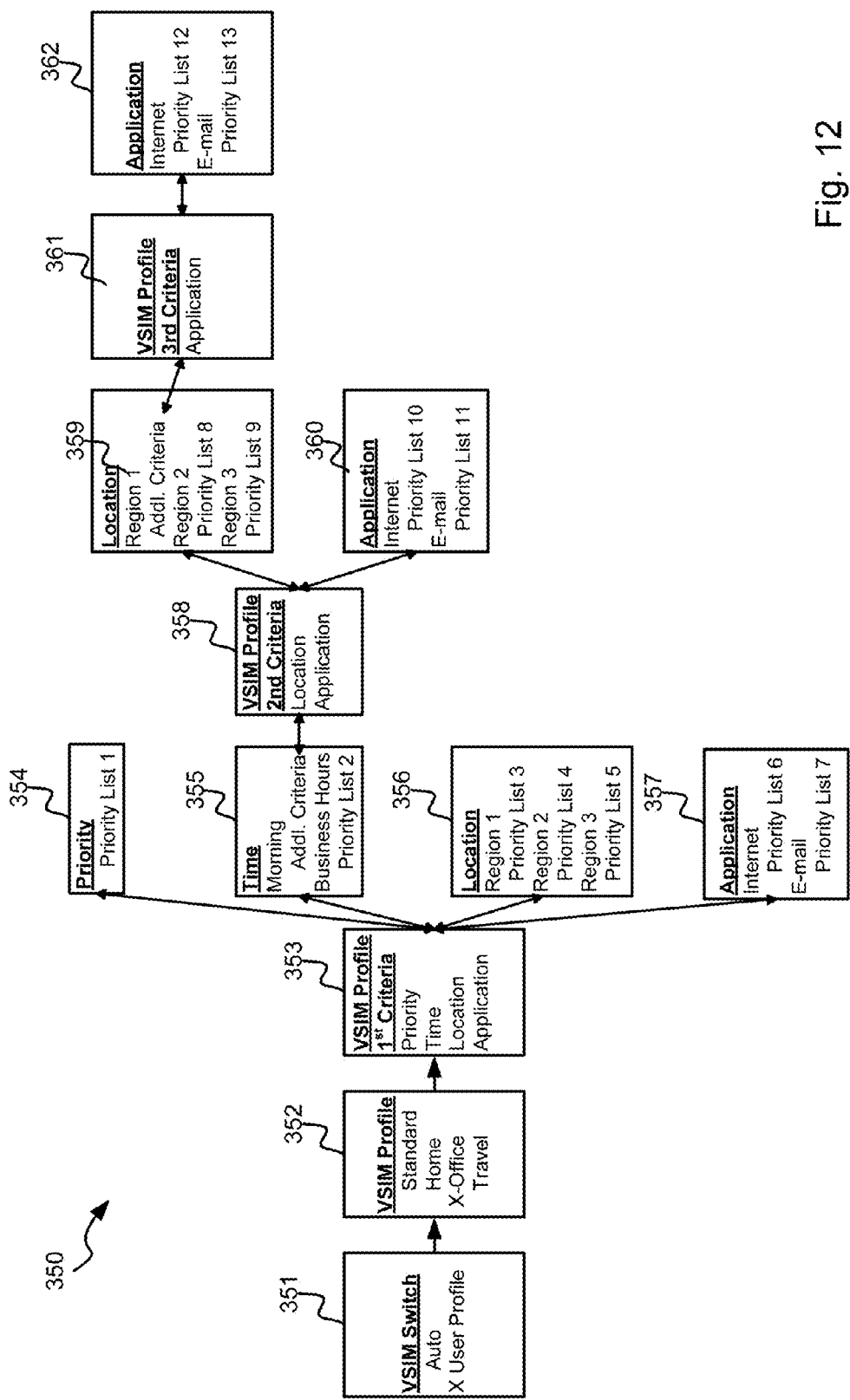
FIG. 12 is a menu tree diagram illustrating an exemplary cascade of menus presented to a user when creating or editing a user profile.

FIG. 12 is an exemplary menu tree 350 which illustrates a possible cascade of menu options available to a user as the user attempts to create a new user profile or edit an existing user profile. The menu tree illustrated in FIG. 12 is not intended to be comprehensive. It is exemplary and only illustrates a limited number of possible options available to a user in editing or creating a user profile.

As shown in FIG. 12, the user may be presented with a choice of operation, menu 351, in which the VSIM service contracts stored on the VSIM memory unit 193 are switched. For example, the various VSIM service contracts stored in the VSIM memory unit 193 may automatically switch based upon some universal criteria such as cost efficiency or QOS or based upon a selected user profile. By selecting the user profile option the user may then be presented with user profile selection option, menu 352. In the user profile selection menu 352, the user may be requested to either select any one of a plurality of existing user profiles stored in memory or generate a new user profile. As shown in FIG. 12, a plurality of existing user profiles have been previously stored in memory. The illustrated examples of user profiles include profiles named "Standard," "Home," "Office," and "Travel." Once an existing profile is selected (e.g., "Office") for editing (or a new profile name is created), the user is presented with a VSIM Profile $1^{st}$ criteria category menu 353 for the user to select a criteria category to define the user profile. As shown in the exemplary menu tree 350, the possible criteria categories include "Time," "Location," and "Application." In addition, users may also select a "Priority" option which allows the user to designate a priority list of possible VSIM service accounts to enable without specifying any criteria values, menu 354. In instances where no criteria category values have been specified, the mobile device may simply seek to enable a VSIM service contract based upon the priority list alone. If a user selects the "Priority" option in the VSIM Profile $1^{st}$ criteria category menu 353, then the user is presented with the priority list menu 354 which allows the user to specify the order of VSIM service contracts in which the mobile device should attempt to enable. In addition, if the "Priority" option is selected, then no other criteria category values other than the priority list itself will be used to select a VSIM service contract to enable.

If the user selects the "Time" option in the VSIM Profile $1^{st}$ criteria category menu 353, then the user may be presented with a time criteria option menu 355 which allows the user to specify various time criteria values. For example, a user may specify morning hours (12:00 am to 9:00 am) as a time criteria value. Alternatively, a user may specify any range of hours as a time criteria value. Once a time criteria value is inputted, the user may be presented with the option of adding other criteria category values to the selected user profile or may be presented with the option to specify the order (i.e., priority list) of VSIM service contracts in which the mobile device should attempt to enable.

If the user elects to add other criteria category values to the selected user profile then the user may be presented with a VSIM Profile $2^{nd}$ Criteria category menu 358. Similar to the VSIM Profile $1^{st}$ Criteria category menu 353, the VSIM Profile $2^{nd}$ Criteria category menu 358 presents the user with additional criteria categories with which the user may specify to define the selected user profile. The VSIM Profile $2^{nd}$ Criteria category menu 358 will be described in more detail below.

If the user elects to specify the priority list order (as opposed to a single VSIM service contract), then the mobile device will attempt to enable the various VSIM service contracts in the order in which they are listed in the priority list (until a network connection is made) when the mobile device detects that the time criteria value has been fulfilled. For example, if the mobile device detects that the current time is within the range of 9:00 am to 5:00 pm (i.e., business hours), then the mobile device will attempt to connect to a network using the VSIM service contracts listed in "Priority List 2" in the order in which they are specified by the user until a network connection is made and the call is completed.

If, under the VSIM Profile $1^{st}$ Criteria menu 353, the user selects the "Location" option (as opposed to the "Time" option), then the user may be presented with a location criteria option menu 356 which allows the user to specify various location criteria values. Similar to the time criteria option menu 355, the user may specify various location values. For example, the user may specify "Region 1," "Region 2," and/or "Region 3." Once a location criteria value is inputted, the user may be presented with the option of adding additional criteria values to the selected user profile or may be presented with the option to specify the order of VSIM service contracts in which the mobile device should attempt to enable. If the user elects to add other criteria category values to the user profile then the user may be presented with a VSIM Profile $2^{nd}$ Criteria menu 358.

In the example illustrated in FIG. 12, for each location "region" a "Priority List" has been specified. Accordingly, if the mobile detects that the current location is within one of the specified regions (i.e., Region 1, Region 2 or Region 3), then the mobile device will attempt to connect to a network using the VSIM service contracts listed in corresponding "Priority List" in the order in which they are specified by the user until a network connection is made and the call is completed.

If, under the VSIM Profile $1^{st}$ Criteria menu 353, the user selects the "Application" option (as opposed to the "Time" or "Location" option), then the user may be presented with an application criteria option menu 357 which allows the user to specify various application criteria values. Similar to both the time criteria option menu 355 and location criteria option menu 356, the user may specify various application values. For example, the user may specify "Internet" "E-Mail." Once an application criteria value is inputted, the user may be presented with the option of adding additional criteria values to the selected user profile or may be presented with the option to specify the order of VSIM service contracts in which the mobile device should attempt to enable. If the user elects to add additional criteria values to the user profile then the user may be presented with a VSIM Profile $2^{nd}$ Criteria menu 358.

As shown in FIG. 12, for each application a "Priority List" has been specified. Accordingly, if the mobile device detects that the current application seeking to conduct a voice or data call, then the mobile device will attempt to connect to a network using the VSIM service contracts listed in corresponding "Priority List" in the order in which they are specified by the user until a network connection is made and the call is completed.

If the user elects to add other criteria category values to the user profile then the user may be presented with a VSIM Profile $2^{nd}$ Criteria category menu 358. The VSIM Profile $2^{nd}$ Criteria category menu 358 presents to the user possible additional criteria categories with which to define the selected user profile. As shown in the exemplary menu tree 350, since the VSIM Profile $2^{nd}$ Criteria category menu 358 was accessed from the time criteria option menu 355 only "Location" and "Application" are displayed as the possible other criteria categories. Similar to the description above, if the user selects the "Location" option then the user may be presented with a location criteria option menu 359 which allows the user to specify various location criteria values. Alternatively, if the user selects the "Application" option, then the user may be presented with an application criteria option menu 360 which allows the user to specify various application criteria values. Each of these respective criteria category option menus allows the user to not only specify criteria values, but also presents the user with the option of adding other criteria category values to the selected user profile or the option to specify the order of VSIM service contracts in which the mobile device should attempt to enable.

If the user elects to specify the priority list order, then the mobile device will attempt to enable the various VSIM service contracts in the order in which they are listed in the priority list (until a network connection is made) when the mobile device detects that the time criteria value has been fulfilled as well as the location or application criteria value. For example, if the mobile device detects that the current time is within the range of 12:00 am to 9:00 am (i.e., morning hours) and the mobile device is in Region 2, then the mobile device will attempt to connect to a network using the VSIM service contracts listed in "Priority List 8" in the order in which they are specified by the user until a network connection is made and the call is completed.

If the user elects to add other criteria category values to the user profile then the user may be presented with a VSIM Profile 3rd Criteria category menu 361. The VSIM Profile 3rd Criteria category menu 361 presents the user with possible additional criteria with which to define the selected or generated user profile. As shown in the exemplary menu tree 350, since the VSIM Profile 3rd Criteria category menu 361 was accessed from the time criteria option menu 355 and location criteria option menu 359, "Application" is displayed as the only remaining possible criteria category. Similar to the description above, once the user selects the "Application" option then the user may be presented with an application criteria option menu 362 which allows the user to specify various application criteria values. In addition to specifying the application criteria values, the user is presented with the option to specify the order of VSIM service contracts in which the mobile device should attempt to enable.

FIG. 13a illustrates a user profile data table 401 which contains pointers to criteria category values defining each user profile. In addition, the user profile data table 401 contains priority list indices which indicate which priority list to implement if the user profile criteria category values are satisfied. FIG. 13a is intended to illustrate an exemplary user profile data table 401 only and is not intended to limit the invention. When a user creates a new user profile, the new user profile name is entered into the "Name" data field of the user profile data table 401. As shown in FIG. 13a, a plurality of user profiles may be stored in memory of a mobile device 101. For example, as shown in FIG. 13a, the user profiles included in a mobile device may include profiles named: "Priority," "Home," "Work," "Travel," "Travel2," "E-mail," "Internet," "Travel 3," "Travel 4," "E-mail2," "MobileTV," "Internet2," and "MobileTV2."

Each user profile may be defined by any number of criteria categories. In the example embodiment illustrated in FIG. 13a, the exemplary user profiles may defined be by up to three criteria categories, namely time, location and application. For example, the "Internet2" user profile is defined by three criteria as indicated by the pointers stored in each of the three criteria columns (data fields). Thus, when the "Internet2" user profile is activated, the VSIM service contract will be switched in accordance with priority list index 12 if all three criteria category values are satisfied. Alternatively, other user profiles such as "Home" may be defined by the "Time" criteria only. Thus, when the "Home" user profile is activated only the "Time" criteria category value must be satisfied before a VSIM service contract switching operation may commence. Otherwise, in both situations, the default VSIM service contract may be maintained to support communications. Still further another user profile may be defined by no criteria values. For example, no criteria value pointers are indicated for the "Priority" user profile. Thus, when the "Priority" user profile is activated, the VSIM service contract will be selected and enabled in accordance with the associated priority list regardless of criteria category values.

When a user creates a new user profile the profile name is stored in the "Name" data field of the user profile data table 401 and a new user profile data record is generated in the user profile table. When a user elects to edit an existing user profile, the desired user profile is selected and the user profile data record is retrieved. In either case, if the user elects to define the selected user profile with specific criteria category values, the user may be first presented with the option of criteria categories to define the selected user profile. Once the criteria category has been selected, the user may be presented with the option to define the selected criteria category with a previously stored criteria value or to input a wholly new criteria value. If the user elects to define the selected user profile with a previously stored value for a particular criteria category, then the pointer for the previously stored value is inputted into the user profile data table 401 under the appropriate criteria category for the selected user profile. Referring to FIG. 13a, the "Home" user profile has pointer C1 stored in the "Time" data field. Thus, the "Home" user profile is defined by the Time criteria value stored under the C1 data field of criteria value table 402 shown in FIG. 13b. Similarly, the "Work" user profile has pointer C1 stored in the "Location" data field of user profile data table 401. Thus, the "Work" user profile is defined by the Location criteria value stored under the C1 data field of criteria value table 402.

If, however, the user elects to input a wholly new criteria value, then a the new criteria value is inputted into a new data field of the criteria value data table 402 and the pointer for the new criteria value is input into the appropriate criteria category for the selected user profile.

In addition, each user profile listed in user profile data table 401 has a priority list index indicated in the "Priority Index" data field. As a user designates the particular order of VSIM service contracts in which the mobile device 101 should attempt to enable, the order is saved in priority index table 403, described in more detail with respect to FIG. 13c. The index corresponding to the specified ordered list is stored in the user profile date table 401. As with the criteria category values, the user may be presented with the option to designate a previously stored priority list for the currently selected user profile. If the user elects to reuse an existing priority list, then the priority list index corresponding to the ordered list is stored in the user profile data table 401 corresponding with the selected user profile.

FIG. 13b illustrates a criteria value data table 402 which stores specific user defined criteria values for each of the criteria categories defining the various user profiles. The criteria categories are listed in the first data field under the heading "Criteria." As shown in FIG. 13b, the possible criteria categories used in the exemplary criteria value data table include "Time," "Location," and "Application." Each of these criteria categories occupies its own data record. It should be noted that while the exemplary criteria value table 402 shown in FIG. 13b indicates only three criteria categories, an unlimited number of criteria categories may be designated to define the various user profiles. Each new criteria category would simply occupy a new data record in criteria value data table 402. Criteria value data table 402 may also store specified criteria values for each criteria category. For example, data field C1 of the exemplary criteria value data table 402 has stored "8:00 am-5:00 pm" for the "Time" criteria category, "North America" for the "Location" criteria category, and "Voice" for the "Application" criteria category. Each of the criteria values may have nothing in common with the other criteria values in the C1 data field other than each was the first criteria value stored for its respective criteria category. As discussed above, as a user defines a selected user profile by adding various criteria category values, the user may be presented with the criteria values for each criteria category previously stored in criteria value table 402. If the user selects a previously stored criteria value, then a pointer to that criteria value (e.g., C1, C2, C3, etc.) may be stored in the corresponding data record of the selected user profile name in user profile data table 401. However, if the user elects to specify a new criteria category value, a new data field may be added to criteria value data table 402 to accommodate the new criteria category value. If the user desires only to add a new criteria value for one or some of the criteria categories, the remaining criteria categories for the new data field may be left blank until such a time as the user wishes to add a new criteria value for the other criteria categories. In this manner, criteria value data table 402 may continually grow. As each new criteria value is added to the criteria value data table 402, the pointer to the corresponding data field is added to the appropriate criteria category for the selected user profile in user profile data table 401.

FIG. 13c illustrates an exemplary priority index data table 403 which indexes various user-designated ordered lists of VSIM service contracts. For each priority list index, the various VSIM service contracts are placed in the order in which the user desires the mobile device to attempt to enable under certain criteria conditions. As shown in FIG. 13c, not all VSIM service contracts stored in a VSIM memory unit 193 may be included in a particular priority list. For example, referring to FIG. 13c, priority list index 1 indicates that VSIM service account #1 is listed first in the priority list. VSIM service account #2 is listed second in the priority list. VSIM service account #4 is listed third in the priority list. VSIM service accounts #3 and 5-8 are not included in the priority list. Thus, when priority list index 1 is invoked, the mobile device 101 will attempt to enable VSIM service account #1 first. If the connection to the communication network supporting VSIM service account #1 is satisfactory, then the call may be made or received using VSIM service account #1. However, if connection to the communication network supporting VSIM service account #1 is unavailable, for any reason, the mobile device 101 will attempt to enable VSIM service account #2. This process may continue until a connection to a communication network supporting at least one of the VSIM service accounts in the priority list is satisfactory or the priority list is exhausted. It should be noted that the exemplary data tables illustrated in FIGS. 13a-13c and 16 are merely illustrative of a possible data structure that may be implemented to enable the various embodiments. One of skill in the art would appreciate that other data structures may be implemented with equal effectiveness.

Figure 14:
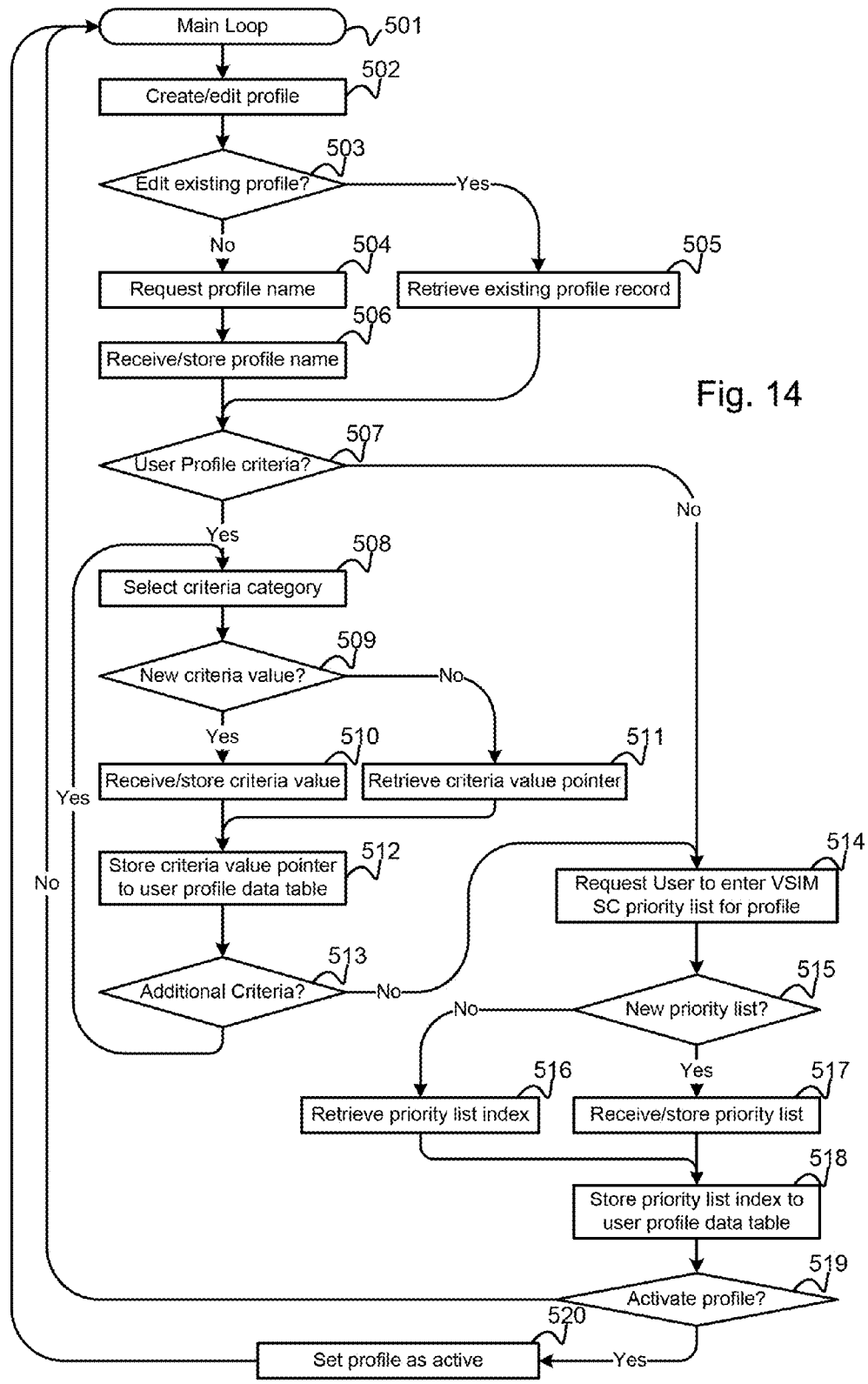
FIG. 14 is a process flow diagram illustrating steps of an embodiment to create or edit a user profile.

FIG. 14 is a process flow diagram illustrating the steps performed in an embodiment when a user is creating or editing a user profile. This embodiment may be implemented as part of the mobile device 101 processor 191 main loop routine 501. A main loop routine 501 may be used to control the various applications and functions of the mobile device 101. At any time during the running of the main loop 501, the mobile device processor 191 may receive a request from the user to create a new user profile or edit an existing user profile, step 502. When a request to create or edit a user profile is received, the mobile device processor 191 may present the user with a menu inquiring whether the user desires to create a new user profile or edit an existing user profile, decision 503. If the user elects to create a new user profile (i.e., decision 503=No), then the mobile device processor 191 requests the user to enter the new user profile name, step 504. The entered new user profile name is received and stored as a new data record in the user profile data table 401 (see FIG. 13a), step 506. If the user elects to edit an existing user profile (i.e., decision 503=Yes), then the user profile record is retrieved from the user profile data table 401, step 505. Once the user profile name has been stored in the user profile data table 401 or the user profile record has been retrieved, the mobile device processor 191 presents the user with a menu inquiring whether the user wishes to add a criteria category value to define the user profile, decision 507. If the user responds to the inquiry in the affirmative (i.e., decision 507=Yes), then the user is requested to select a criteria category, step 508.

Once the criteria category has been selected, the user is then presented with the option of inputting a new criteria category value or utilizing a criteria category value previously stored in memory, decision 509. If the user elects to input a new criteria category value (i.e., decision 509=Yes), then the new criteria category value is received from the user and stored into the criteria value data table 402 as a new data field (or if an empty cell for the selected criteria category exists, in the empty cell), step 510. Once the new criteria category value is stored in the criteria value data table 402, the pointer to the location of the stored criteria category value in the criteria value data table 402 is stored in the corresponding criteria category data field of the user profile data table 401, step 512. If the user elects to utilize an existing criteria category value previously stored in memory (i.e., decision 509=No), then the criteria category value pointer indicating the location of the criteria category value stored in the criteria value data table 402 is retrieved, step 511. Once the criteria category value pointer is retrieved, the pointer to the location of the stored criteria category value in the criteria value table 402 is stored in the corresponding criteria category data field of the user profile data table 401, step 512.

Once the criteria value pointer has been stored in the user profile data table 401, the user is presented with the option to add more criteria categories to further define the selected user profile, decision 513. If the user elects to add more criteria categories to further define the selected user profile (i.e., decision 513=Yes), then steps 508-512 are repeated until no further criteria categories are added by the user. If no further criteria categories are to be added (i.e., decision 513=No), then user is requested to designate the order of VSIM service contracts for the mobile device to attempt to enable, step 514.

In addition, if at decision 507 the user elects to not add or edit any user profile criteria categories (i.e., decision 507=No), then the user is requested to designate the order of VSIM service contracts for the mobile device to attempt to enable, step 514. The user is presented with the option of implementing a previously stored priority list as the order of VSIM service contracts for the mobile device to attempt to enable, decision 515. If the user elects to designate a new priority list (i.e., decision 515=Yes), then the order of VSIM service contracts that user desires the mobile device to attempt to enable is received and stored as a new priority list, step 517. This priority list is stored in the priority list index data table 403 and an index corresponding to the new priority list is assigned and stored in the priority list index data table 403. If the user elects to implement a previously designated priority list (i.e., decision 515=No), then the index corresponding to desired priority list is retrieved from the priority list index data table 403, step 516. Once the priority list index is retrieved (step 516) or the new index corresponding to the new priority list is assigned (step 517), the index corresponding to the priority list is stored in the user profile data table 401 in the data record corresponding to the selected user profile, step 518. Once the priority list index is stored in the user profile data table 401, the user may be presented with the option of activating the selected user profile, decision 519. If the user elects to activate the selected user profile (i.e., decision 519=Yes), then the selected user profile is set to active, step 520. This may be accomplished by setting a flag in the user profile data table 401 (not shown) or placing the active user profile name or a data pointer to the activated user profile in a memory register. Once the user profile is activated the mobile device processor returns to the main loop 501. If, however, the user elects to not activate the selected user profile (i.e., decision 519=No), then the mobile device processor 191 simply returns to the main loop 501 without activating the user profile.

Figure 15:
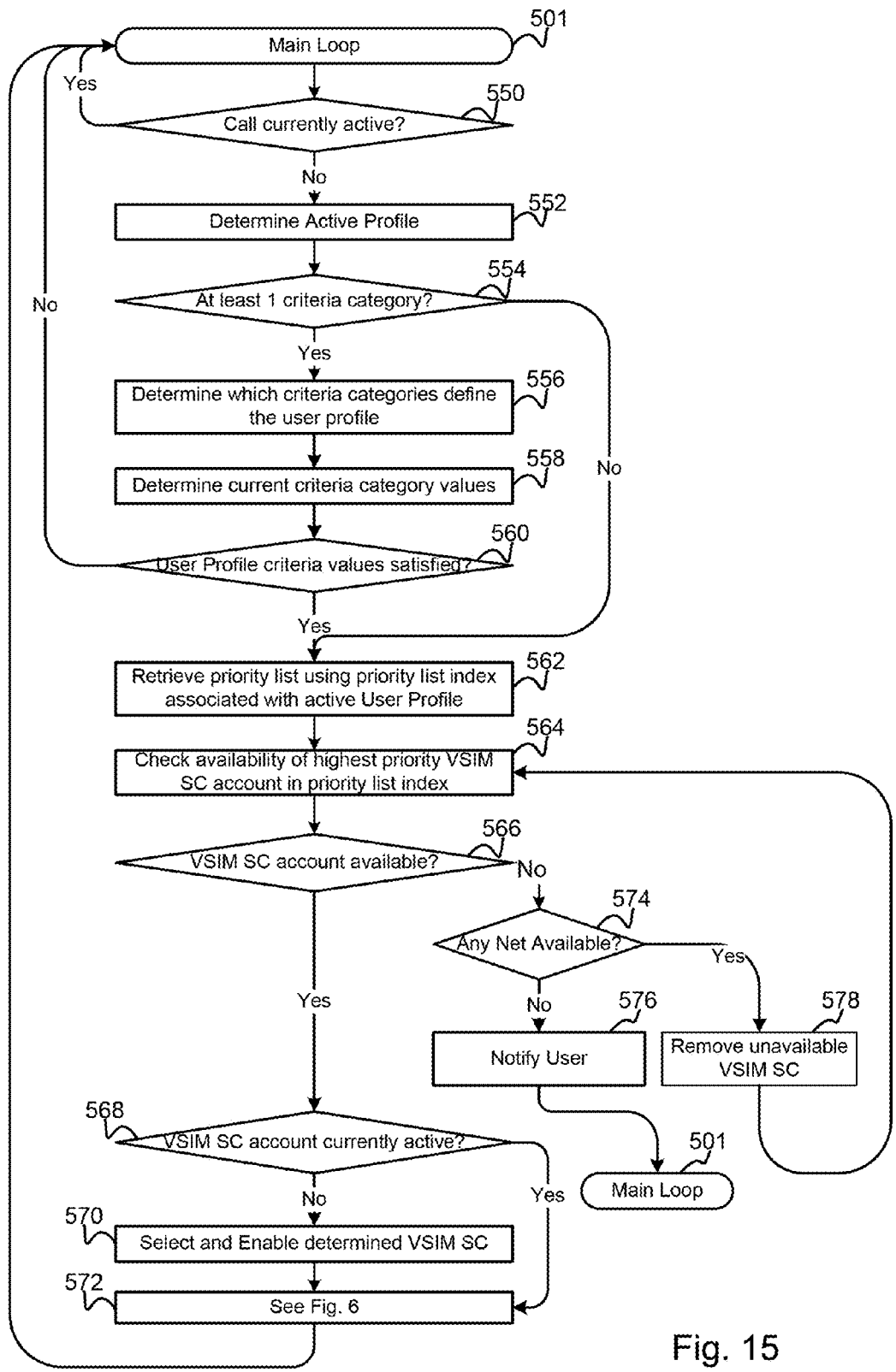
FIG. 15 is a process flow diagram illustrating steps of an embodiment to automatically select a VSIM service contract to complete a call in accordance with a user specified preference.

FIG. 15 illustrates an embodiment process flow for the selection of a VSIM service contract from a plurality of VSIM service contracts stored in the VSIM memory unit 193 based upon an activated user profile and various criteria values. A mobile device processor 191 may execute a main loop 501 which controls and monitors the activity of several applications and activities. During the execution of the main loop 501, the processor 191 may periodically determine whether it is necessary to switch a VSIM service contract in accordance with a user profile. In an embodiment method, the processor 191 may determine if a call is currently active, decision 550. If a call is currently active (i.e., decision 550=Yes), then the processor 191 returns to the main loop 501. By returning to the main loop, the embodiment method insures that an active call is not dropped while the VSIM service contract is being switched out. If there is no call currently active (i.e., decision 550=No), then the processor 191 may continue to determine if the VSIM service contract should be switched in accordance with a user profile. The processor 191 must first determine which user profile is currently active, step 552. This may be accomplished by checking to see which user profile in the user profile data table 401 has a flag set or by retrieving the user profile name or pointer from a data register. Once the active user profile name has been determined, the user profile data table 401 is checked to determine if the activated user profile has at least one criteria category value that defines the user profile, decision 554. If the activated user profile has at least one criteria category value defining the user profile (i.e., decision 554=Yes), then the processor 191 may refer to the user profile data table 401 to determine which criteria categories define the activated user profile, step 556. To determine which criteria categories define the activated user profile, the processor 191 determines if a pointer is stored in each of the criteria category data fields of the user profile data table 191. If a pointer is stored in a particular criteria category column, then that criteria category is used to determine the proper priority list to implement. Once the processor 191 determines which criteria categories are used in the activated user profile (step 556) the processor 191 determines the current criteria value for each of those criteria categories, step 558. These current criteria values may be temporarily stored in a memory buffer.

Based upon the criteria value pointer stored in the user profile data table 401, the processor 191 retrieves the criteria value stored in criteria value data table 402 to compare against the determined current values for each criteria category stored in the memory buffer. If all of the current criteria values satisfy the relevant criteria values stored in the criteria value data table 402 (i.e., decision 560=Yes), then the processor 191 may retrieve the priority list from the priority list index table 403 using the priority list index stored in the user profile data table 401 for the activated user profile, step 562. If the any of the current criteria values fails to satisfy any of the relevant criteria values stored in the criteria value data table 402 (i.e., decision 560=No), then the processor 191 returns to the main loop 501.

In addition, if after determining the active user profile in step 552 and the criteria categories which might define the active user profile it is determined that no criteria categories pointers are stored in the active user profile (i.e., decision 554=No), then the processor 191 may also retrieve the priority list from the priority list index table 403 using the priority list index stored in the user profile data table 401 for the activated user profile having no criteria category pointers stored in its data record, step 562.

Once the priority list of VSIM service contracts is retrieved from the priority list index data table 403 using the priority list index stored in the user profile data table 401, the processor 191 of the mobile device 101 determines if the communication network supporting the highest priority VSIM service contract is available to the mobile device 101, step 564 and decision 566. If the communication network supporting the highest priority VSIM service contract is not available to the mobile device 101 (i.e., decision 566=No), then the processor 191 of the mobile device 101 determines whether there are any communication networks available, decision 574. It may be the case that the mobile device 101 is located in a geographic area in which the pilot signal cannot be received from any communication network, such as if the mobile device 101 is underground. If the mobile device 101 is not receiving the pilot signal from any communication network (i.e., decision 574=No), then the user may be notified of the situation, step 576, and the mobile device 101 processor 191 returns to the main loop, step 501. If the mobile device 101 processor 191 determines that other communication networks are available (i.e., decision 574=Yes), then the VSIM service contract supported by the unavailable communication network is removed from consideration, step 578, and the availability of the next highest priority VSIM service contract is checked again, step 564. In this manner, unavailable VSIM service contracts (or VSIM service contracts whose supporting communication networks are unavailable) will be removed from consideration until the highest priority VSIM service contract whose supporting communication network is available is determined in step 564.

Once a communication network supporting the highest priority VSIM service contract is available to the mobile device 101 (i.e., decision 566=Yes), the mobile device processor 191 determines if the highest priority VSIM service contract available is currently active on the VSIM memory unit 193, decision 568. If the currently enabled VSIM service contract account is the same as the highest priority available VSIM service contract (i.e., decision 568=Yes), then the communication call may be established using the enabled VSIM service contract account in accordance with steps 221-232 described above with reference to FIG. 6, step 572.

If the highest priority available VSIM service contract account is not currently active (i.e., decision 568=No), then the mobile device processor 191 may access the mobile device VSIM memory unit 193 to select and enable the highest priority available VSIM service contract account, step 570, by copying the highest priority available VSIM service contract account provisioning data stored in the VSIM memory unit 193 into the enabled VSIM provisioning data buffer 314. Once the highest priority available VSIM service contract account provisioning data is enabled into the VSIM provisioning data buffer 314, the mobile device 101 may establish a call in accordance with steps 221-232 described above with reference to FIG. 6, step 288. Alternatively, the mobile device processor 191 may select and enable the highest priority available VSIM service contract by retrieving the highest priority available VSIM service contract account provisioning data from the location within the VSIM memory unit 193 via a pointer, step 570. Once the call has been either connected or terminated in accordance with the process flow described above with reference to FIG. 6, the mobile device processor 191 may return to the main loop, step 501.

In an alternative embodiment, a mobile device 101 may support a finite number of user profiles depending upon the number of possible criteria categories and criteria category value options that are made available to the user. As the number of criteria categories increase, and the precision (granularity) of criteria category value options increases, the larger the number of finite user profiles may be presented to the user to choose from. For example, time value options may be offered in months, weeks, days, groups of hours, individual hours, minutes, etc. Location value options may be offered by continent, country, region, cell tower, etc. Each of the user profiles may be defined by the same criteria categories but differentiated by the different criteria values for each criteria category. Prior to user specification, each of the finite user profiles implements a default VSIM service contract or priority list when its criteria values are satisfied. Thus, prior to any user customization, for all possible situations the mobile device 101 will enable the default VSIM service contract or priority list When a user desires to customize a user profile, the user is prompted to select a criteria value option for each criteria category. The user may then optionally name the particular combination of criteria category values. The user may then customize the particular VSIM service contract or priority list associated with the particular combination of criteria values. In this manner, when the specific combination of criteria category values is satisfied, the VSIM service contract may be switched out in accordance with the user customized priority list.

FIG. 16 illustrates an exemplary user profile data table 405 for use in an alternative embodiment. As shown in FIG. 16, the exemplary alternative embodiment the finite user profiles are defined by three criteria categories; namely, time, location, and application. One of skill in the art would appreciate that the user profiles may be defined by more than three criteria categories. The use of three criteria categories; namely, time, location, and application are for illustrative purposes only. These criteria categories are shown in the user profile data table 405 as data field headings. For each criteria category there may be a limited number of criteria value options. For example, a user may be presented with three criteria value options for the time category. These three time value options may include morning (12:00 am to 8:00 am), business (8:00 am to 5:00 pm), and evening (5:00 pm to 12:00 am). Similarly, the user may be presented with three criteria value option for the location category. These three location value option may include: North America, Europe, and Asia. Similarly, the user may be presented with three criteria value options for the application category. These three application value option may include: voice, text, and Internet. Given these criteria value options, a user may generate twenty seven possible combinations to define twenty seven possible user profiles. FIG. 16 illustrates the twenty seven possible user profile combinations. Thus, the user is presented with twenty seven possible combinations in which the user can specify a priority list order of VSIM service contracts that the mobile device will attempt to enable in order to support communications. One of skill in the art would appreciate that fewer or more criteria categories and criteria values may be implemented. While twenty seven possible combinations may seem on its face limited, many user may find that only a very small number of possible criteria category value combination require customization. For a majority of possible combinations, a user may find that the default priority list will suffice. As such, the user may elect to only customize a limited number of possible combinations.

In the example illustrated in FIG. 16, several of the possible criteria category value combinations indicate that the default priority list is associated with the particular combination. Other combinations have a priority list index associated with the combination indicating that a user has customized those particular combinations of criteria category values. In addition, the particular combinations of criteria category values have a user customized name associated with the combination. For example, a user may have customized the combination of Time=Business; Location=North America; and Application=Voice to be associated with a priority list with index "1" and renamed "Work Voice." The alternative user profile data table 405 may be utilized by the mobile device processor 191 in conjunction with a priority list index data table 403 similar to the one shown in FIG. 13*c* to determine when to automatically replace a VSIM service contract.

Figure 17:
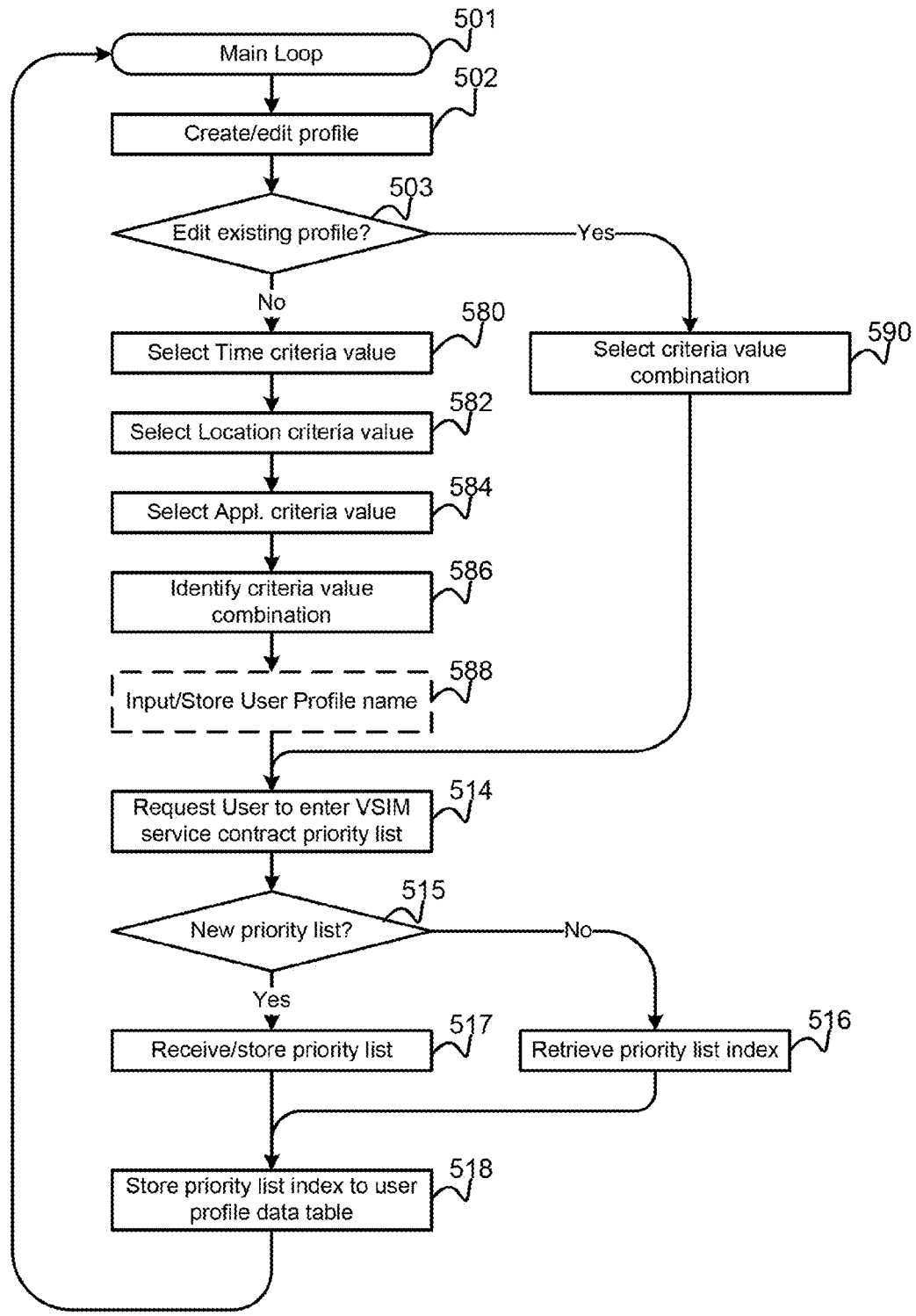
FIG. 17 is a process flow diagram illustrating steps of an alternative embodiment to create or edit a user profile.

FIG. 17 is a process flow diagram illustrating the steps to customize a user profile combination according to the alternative embodiment described above with reference to FIG. 16. As with the embodiment described above, the alternative embodiment may be implemented as part of the mobile device processor 191 main loop routine 501. A main loop routine 501 may be used to control the various applications and functions of the mobile device 101. At any time during the running of the main loop 501, the mobile device processor 191 may receive a request from the user to create a new user profile or edit an existing user profile, step 502. When a request to create or edit a user profile is received, the mobile device processor 191 may present the user with a menu inquiring whether the user desires to create a new user profile or edit an existing user profile, decision 503. If the user elects to create a new user profile (i.e., decision 503=No), then the mobile device processor 191 presents the user with a menu requesting the user to select one of the possible time criteria value options, step 580, location criteria value options, step 582, and application criteria value options, step 584. One of skill in the art would appreciate that the order of these steps is arbitrary. In addition, additional steps may be inserted or steps removed if the user profiles are defined by fewer or more criteria categories. Once all criteria category value options have been selected, the mobile device processor 191 may identify which of the criteria value combinations has been selected, step 586. The user may further be optionally presented with a request to name the specified criteria value combination. The inputted name may be stored in the user profile data table 405, step 588.

Alternatively, if the user elects to edit an existing user profile combination, then the user may be presented with a menu to select the particular criteria value combination by name. Otherwise the user may simply select the desired criteria value options making up the named combination through steps 580-586. Once the new/edited criteria value combination has been selected and identified, the mobile device processor 191 may present the user with a menu requesting the user to input the order of VSIM service contracts in which the user wishes the mobile device to attempt to enable to support a call when the particular criteria value combination is satisfied, step 514. The alternative embodiment may then implement steps 515-518 as described above to enter and store the user specified priority list to a priority list index data table 403 and the priority list index to user profile data table 405. Once the priority list and priority list index have been properly stored in the appropriate data tables, the mobile device processor 191 may return to the main loop 501.

Figure 18:
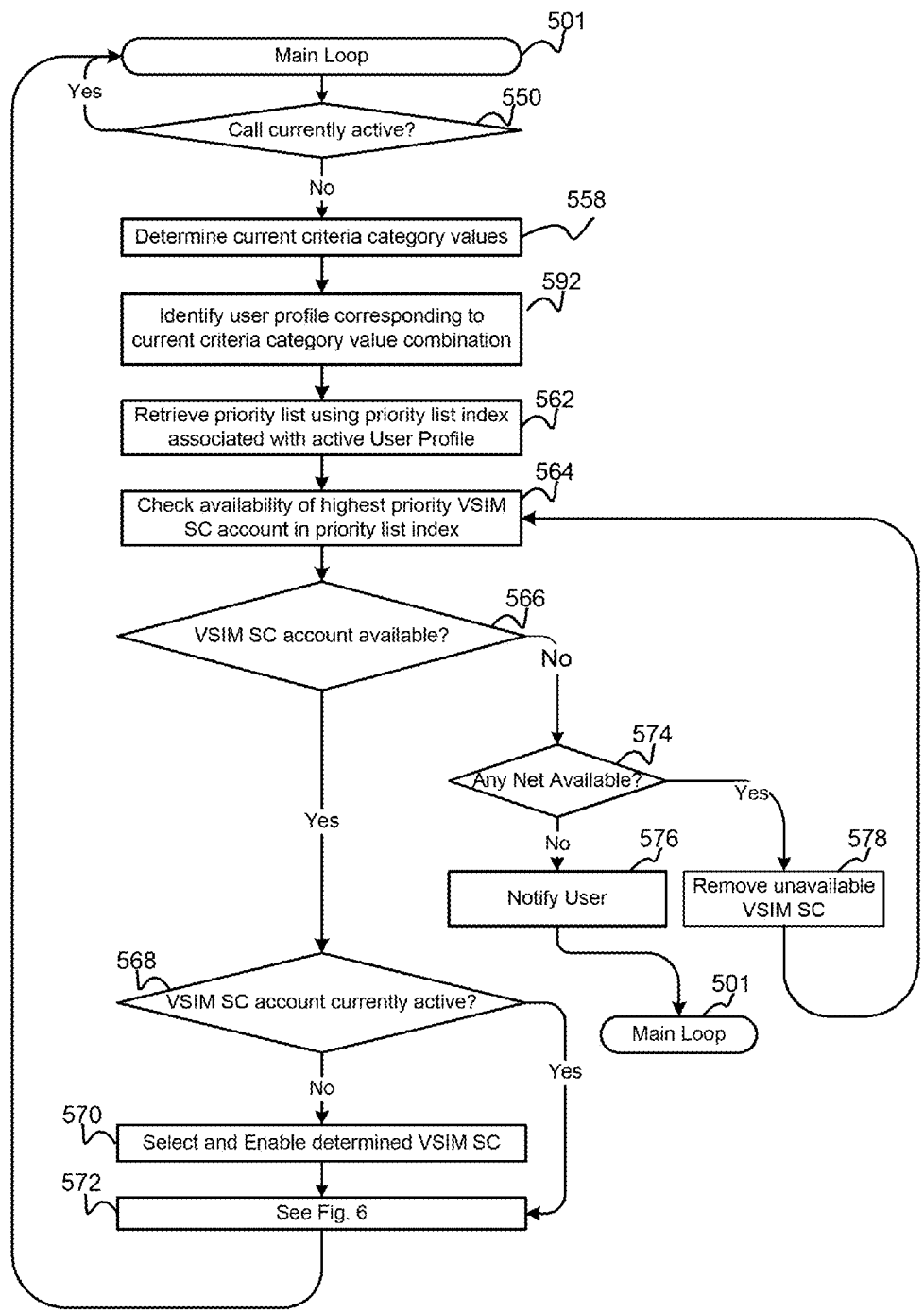
FIG. 18 is a process flow diagram illustrating steps of an alternative embodiment to automatically select a VSIM service contract to complete a call in accordance with a user specified preference.

FIG. 18 is a process flow of steps implemented by an alternative embodiment method to switch VSIM service contracts in accordance with a customized user profile. As with the process flow diagram illustrated in FIG. 15 and described above, the alternative embodiment begins by executing a main loop 501 which controls and monitors the activity of several applications and activities. During the execution of the main loop 501, the processor 191 may periodically determine whether it is necessary to switch a VSIM service contract in accordance with a user profile. The processor 191 may determine if a call is currently active, decision 550. If a call is currently active (i.e., decision 550=Yes), then the processor 191 returns to the main loop 501. By returning to the main loop, the embodiment method insures that an active call is not dropped while the VSIM service contract is being switched out. If there is no call currently active (i.e., decision 550=No), then the processor 191 may determine the current values of each of the criteria categories, step 558. Once the current criteria category values have been determined, the user profile associated with the user profile satisfied by the current criteria category values may be identified in the user profile data table 405, step 592. Once the user profile is identified, the priority list index associated with the user profile may be retrieved from the user profile data table 405. In instances where the user has not specified a priority list for the user profile, the default priority list will be implemented. In instances where the user has specified a priority list for the user profile, a priority list index will allow the mobile device processor 191 to retrieve the user specified priority list from a priority list index data table 403, step 564. Once the appropriate priority list has been retrieved, the mobile device processor may implement steps 566-578 as discussed above with respect to the process flow diagram illustrated in FIG. 15 to implement the appropriate VSIM service contract to support communications over a wireless network. In this manner, one of a plurality of VSIM service contracts stored in a VSIM memory unit 193 may be selected to support communications in accordance with a user's preference. As the situation changes (e.g., mobile device travels to a new location, time changes, and/or the user wishes to initiate a new application), a user may specify which VSIM service contract is implemented to support a communication call according to the user's preference.

The foregoing embodiments have been described as being performed by the mobile device processor. One of skill in the art would appreciate that the foregoing embodiments may also be alternatively performed by a remote server processor, where the user profile data tables, criteria category data tables and priority list index data tables are stored in a remote server memory. Current criteria category values may be determined by the mobile device 101 and transmitted to the remote server for comparison against the various values in the remotely stored user profile data tables, criteria category data tables and priority list index data tables. Once a determination is made as to which priority list to implement, such determinations may be transmitted to the mobile device 101 for implementation.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order.

The hardware used to implement the foregoing embodiments may be processing elements and memory elements configured to execute a set of instructions, including microprocessor units, microcomputer units, programmable floating point gate arrays (FPGA), and application specific integrated circuits (ASIC) as would be appreciated by one of skill in the art, wherein the set of instructions are for performing method steps corresponding to the above methods. Alternatively, some steps or methods may be performed by circuitry that is specific to a given function.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a mobile handset are intended to encompass any one or all memory modules within the mobile handset without limitation to a particular configuration, type or packaging. An exemplary storage medium is coupled to a processor in either the mobile handset or the theme server such that the processor can read information from, and write information to, the storage medium. In the alternative, the storage medium may be integral to the processor. The processor and the storage medium may reside in an ASIC.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

We claim:

1. A method for supporting a wireless communication call on a mobile device having a VSIM internal memory unit having stored therein provisioning data for a plurality of service contracts, comprising:
   storing a plurality of prioritized lists of service contracts, wherein priority of the service contracts in each of the prioritized lists is determined by user inputs to the mobile device;
   storing a plurality of user profiles, wherein each of the plurality of user profiles specifies one or more criteria categories for selecting one of the plurality of prioritized lists of service contracts for use in supporting the wireless communication call;
   identifying one of the plurality of user profiles as an active user profile;
   determining the criteria categories specified by the active user profile, wherein each of the specified criteria categories is associated with a data field that stores a user-defined criteria category value for the active user profile;
   collecting a current criteria value from the mobile device for each of the criteria categories specified by the active user profile;
   comparing the collected current criteria values to the user-defined criteria category values stored for each of the criteria categories specified by the active user profile;
   retrieving one of the plurality of prioritized lists of service contracts associated with the active user profile if the collected current criteria values satisfy the user-defined criteria category values stored for the specified criteria categories;
   retrieving from the VSIM memory unit the provisioning data corresponding to a highest priority service contract appearing in the retrieved prioritized list of service contracts; and
   attempting to establish a communication link to a communication network using the retrieved provisioning data.

2. The method of claim 1, wherein the one or more criteria categories specified by the active user profile comprise a time of day criteria category, a mobile device location criteria category, and an application criteria category.

3. The method of claim 2, wherein the application criteria category corresponds to a type of wireless communication call being initiated, and wherein the user-defined criteria category value for the application criteria category comprises one application type selected from the group consisting of voice call, SMS text, email, Internet browsing, and MobileTV.

4. The method of claim 1, further comprising:
   determining whether a communication network supporting the highest priority service contract is available to the mobile device;
   removing the communication network supporting the highest priority service contract from consideration if the communication network is unavailable to the mobile device; and
   retrieving from the VSIM internal memory unit the provisioning data corresponding to a next highest priority service contract in the retrieved prioritized list of service contracts.

5. The method of claim 1, further comprising:
   determining if a wireless communication call on the mobile device is currently active; and
   establishing a communication link to a communication network using the retrieved provisioning data corresponding to the highest priority service contract only if a wireless communication call on the mobile device is not currently active.

6. A mobile device, comprising:
   means for receiving user input;
   means for storing provisioning data for a plurality of service contracts;
   means for storing a plurality prioritized lists of service contracts, wherein priority of the service contracts in each of the prioritized lists is determined by user input;
   means for storing a plurality of user profiles, wherein each of the plurality of user profiles specifies one or more criteria categories for selecting one of the plurality of prioritized lists of service contracts for use in supporting a wireless communication call;
   means for identifying one of the plurality of user profiles as an active user profile;
   means for determining the criteria categories specified by the active user profile; wherein each of the specified criteria categories is associated with a data field that stores a user-defined criteria category value for the active user profile;
   means for collecting a current criteria value for each of the criteria categories specified by the active user profile;
   means for comparing the collected current criteria values to the user-defined criteria category values stored for each of the criteria categories specified by the active user profile;
   means for retrieving one of the plurality of prioritized lists of service contracts associated with the active user profile if the collected current criteria values satisfy the user-defined criteria category values stored for the specified criteria categories;
   means for retrieving the provisioning data corresponding to a highest priority service contract listed in the retrieved one of the plurality of prioritized lists of service contracts; and
   means for attempting to establish a communication link to a communication network using the retrieved provisioning data.

7. The mobile device of claim 6, wherein the one or more criteria categories specified by the active user profile comprise a time of day criteria category, a mobile device location criteria category, and an application criteria category.

8. The mobile device of claim 7, wherein the application criteria category corresponds to a type of wireless communication call being initiated, and wherein the user-defined criteria category value for the application criteria category comprises an application type selected from the group consisting of voice call, SMS text, email, Internet browsing, and MobileTV.

9. The mobile device of claim 6, further comprising:
means for determining whether a communication network supporting the highest priority service contract is available to the mobile device;
means for removing the communication network supporting the highest priority service contract from consideration if the communication network is unavailable to the mobile device; and
means for retrieving from the VSIM internal memory unit provisioning data corresponding to a next highest priority service contract in the retrieved prioritized list of service contracts.

10. The mobile device of claim 6, further comprising:
means for determining if a wireless communication call on the mobile device is currently active; and
means for establishing a communication link to a communication network using the retrieved provisioning data only if a wireless communication call on the mobile device is not currently active.

11. A server, comprising:
a memory having stored therein a plurality of user profiles, wherein each of the plurality of user profiles specifies one or more criteria categories for selecting one of a plurality of prioritized lists of service contracts stored in the memory;
a processor coupled to the memory;
a communication interface circuit coupled to the processor, the communication interface circuit configured to connect the processor to a communication network, wherein priority of the service contracts in each of the prioritized lists is received over the communication network from user inputs at a mobile device,
wherein the processor is configured with processor-executable instructions to perform steps comprising:
identifying one of the plurality of user profiles as an active user profile;
determining the criteria categories specified by the active user profile, wherein each of the specified criteria categories is associated with a data field that has a stored criteria category value for the active user profile, wherein the stored criteria value is received over the communication network from user inputs at the mobile device;
receiving a collected current criteria value from the mobile device for each of the criteria categories specified by the active user profile;
comparing the collected current criteria values to the stored criteria category values for each of the criteria categories specified by the active user profile;
retrieving one of the prioritized lists of service contracts associated with the active user profile if the collected current criteria values satisfy the stored criteria category values for the specified criteria categories; and
transmitting to the mobile device via the communication interface circuit a priority list index, wherein the priority list index is an indicator of the retrieved prioritized list of service contracts.

12. The server of claim 11, wherein the one or more criteria categories specified by the active user profile comprise a time of day criteria category, a mobile device location criteria category, and an application criteria category.

13. The server of claim 12, wherein the application criteria category corresponds to a type of wireless communication call, and wherein the stored criteria value for the application criteria category comprises an application type selected from the group consisting of voice call, SMS text, email, Internet browsing, and MobileTV.

14. A mobile device comprising:
a user interface;
a processor; and
an internal memory unit coupled to the processor, the internal memory unit including a VSIM provisioning data buffer and having stored thereon:
provisioning data for a plurality of service contracts within a VSIM memory unit;
a plurality of user profiles; and
a plurality of prioritized lists of service contracts, wherein priority of the service contracts is determined by inputs received from the user interface,
wherein each of the plurality of user profiles specifies one or more criteria categories for selecting one of the plurality of prioritized lists of service contracts for use in supporting a wireless call; and
wherein the processor is configured with processor-executable instructions to perform steps comprising:
identifying one of the plurality of user profiles as an active user profile;
determining the criteria categories specified by the active user profile, wherein each of the specified criteria categories is associated with a data field that stores a user-defined criteria category value for the active user profile;
collecting a current criteria value for each of the criteria categories specified by the active user profile;
comparing the collected current criteria values to the user-defined criteria category values stored for each of the criteria categories specified by the active user profile;
retrieving one of the plurality of prioritized lists associated with the active user profile if the collected current criteria values satisfy the user-defined criteria category values stored for the specified criteria categories;
retrieving from the VSIM memory unit the provisioning data corresponding to a highest priority service contract appearing in the retrieved prioritized list of service contracts; and
attempting to establish a communication link to a communication network using the retrieved provisioning data.

15. The mobile device of claim 14, wherein the one or more criteria categories specified by the active user profile comprise criteria a time of day criteria category, a mobile device location criteria category, and an application criteria category.

16. The mobile device of claim 15, wherein the application criteria category corresponds to a type of wireless communication call, and wherein the user-defined criteria category value for the application criteria category comprises an application type selected from the group consisting of voice call, SMS text, email, Internet browsing, and MobileTV.

17. The mobile device of claim 14, wherein the processor is further configured with software instructions to perform steps further comprising:
determining whether a communication network supporting the highest priority service contract is available to the mobile device;
removing the communication network supporting the highest priority service contract from consideration if the communication network is unavailable to the mobile device; and
retrieving from the VSIM internal memory unit provisioning data corresponding to a next highest priority service contract in the retrieved prioritized list of service contracts.

18. The mobile device of claim 14, wherein the processor is further configured with software instructions to perform steps further comprising:
  determining if a wireless communication call on the mobile device is currently active; and
  establishing a communication link to a communication network using the retrieved provisioning data only if a wireless communication call on the mobile device is not currently active.

19. A non-transitory processor-readable storage medium having stored thereon processor-executable instructions configured to cause a processor to perform steps comprising:
  storing a plurality of prioritized lists of service contracts, wherein the priority of the service contracts in each list is determined by inputs received from a user interface;
  storing a plurality of user profiles, wherein each of the plurality of user profiles specifies one or more criteria categories for selecting one of the plurality of prioritized lists of service contracts for use in supporting a wireless communication call;
  identifying one of a plurality of user profiles as an active user profile;
  determining the criteria categories specified by the active user profile, wherein each of the specified criteria categories is associated with a data field that stores a user-defined criteria category value for the active user profile;
  collecting a current criteria value a mobile device for each of the criteria categories specified by the active user profile;
  comparing the collected current criteria values to the user-defined criteria category value stored for each of the criteria categories specified by the active user profile;
  retrieving one of the plurality of prioritized lists of service contracts associated with the active user profile if the collected current criteria values satisfy the user-defined criteria category values stored for the specified criteria categories;
  retrieving from a VSIM internal memory unit the provisioning data corresponding to a highest priority service contract appearing in the prioritized list of service contracts; and
  attempting to establish a communication link to a communication network using the retrieved provisioning data.

20. The non-transitory processor-readable storage medium of claim 19, wherein the one or more criteria categories specified by the active user profile comprise a time of day criteria category, a mobile device location criteria category, and an application criteria category.

21. The non-transitory processor-readable storage medium of claim 20, wherein the application criteria category corresponds to a type of wireless communication call being initiated, and wherein the user-defined criteria category value for the application criteria category comprises one application type selected from the group consisting of voice call, SMS text, email, Internet browsing, and MobileTV.

22. The non-transitory processor-readable storage medium of claim 19, wherein the stored processor-executable instructions are configured to cause a processor to perform further steps comprising:
  determining whether a communication network supporting the highest priority service contract is available to the mobile device;
  removing the communication network supporting the highest priority service contract from consideration if the communication network is unavailable to the mobile device; and
  retrieving from the VSIM internal memory unit provisioning data corresponding to a next highest priority service contract in the retrieved prioritized list of service contracts.

23. The non-transitory processor-readable storage medium of claim 19, wherein the stored processor-executable instructions are configured to cause a processor to perform further steps comprising:
  determining if a wireless communication call on the mobile device is currently active; and
  establishing a communication link to a communication network using the retrieved provisioning data only if a wireless communication call on the mobile device is not currently active.

* * * * *